(12) United States Patent
LeBeau et al.

(10) Patent No.: US 8,200,847 B2
(45) Date of Patent: Jun. 12, 2012

(54) VOICE ACTIONS ON COMPUTING DEVICES

(75) Inventors: Michael J. LeBeau, Palo Alto, CA (US); John Nicholas Jitkoff, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,710

(22) Filed: Sep. 30, 2011

(65) Prior Publication Data

US 2012/0022876 A1    Jan. 26, 2012

Related U.S. Application Data

(63) Continuation of application No. 12/914,965, filed on Oct. 28, 2010.

(60) Provisional application No. 61/255,847, filed on Oct. 28, 2009.

(51) Int. Cl.
*G06F 15/16* (2006.01)

(52) U.S. Cl. ........ 709/249; 709/204; 709/231; 709/238; 709/217; 715/705; 715/753; 701/300; 701/438; 701/533; 701/414; 704/235; 704/9; 704/275

(58) Field of Classification Search .................. 709/204, 709/238, 249, 231; 701/201, 202, 200, 209, 701/213, 208; 704/235, 275, 270, 9; 715/705, 715/753, 716; 455/404.2, 404.1, 456.3; 370/260, 370/261, 270; 707/722, 706; 379/202.01; 342/357.22, 357.75, 357.64; 340/995.24, 340/539.11
See application file for complete search history.

(56) References Cited

U.S. PATENT DOCUMENTS

| | | | | |
|---|---|---|---|---|
| 5,177,685 | A | * | 1/1993 | Davis et al. ................ 455/456.5 |
| 5,908,465 | A | * | 6/1999 | Ito et al. ........................ 701/211 |
| 7,689,355 | B2 | * | 3/2010 | Abernethy et al. ........... 701/213 |
| 2004/0036649 | A1 | * | 2/2004 | Taylor ...................... 342/357.06 |
| 2004/0133345 | A1 | | 7/2004 | Asahara |
| 2005/0235209 | A1 | | 10/2005 | Morita et al. |
| 2006/0026537 | A1 | * | 2/2006 | L'Heureux .................. 715/863 |
| 2006/0036945 | A1 | | 2/2006 | Radtke et al. |
| 2006/0069458 | A1 | | 3/2006 | Lee et al. |

(Continued)

FOREIGN PATENT DOCUMENTS

DE    197 09 518    3/1998

(Continued)

OTHER PUBLICATIONS

Transcription of a radio broadcast from Aug. 15, 2010, of 'this Week in TECH' with Leo Laporte & Friends; 1 page.

(Continued)

*Primary Examiner* — Vijay B Chawan
(74) *Attorney, Agent, or Firm* — Fish & Richardson P.C.

(57) ABSTRACT

A computer-implemented method includes receiving spoken input at a computing device from a user of the computing device, the spoken input including a carrier phrase and a subject to which the carrier phrase is directed, providing at least a portion of the spoken input to a server system in audio form for speech-to-text conversion by the server system, the portion including the subject to which the carrier phrase is directed, receiving from the server system instructions for automatically performing an operation on the computing device, the operation including an action defined by the carrier phrase using parameters defined by the subject, and automatically performing the operation on the computing device.

30 Claims, 13 Drawing Sheets

U.S. PATENT DOCUMENTS

| | | | |
|---|---|---|---|
| 2006/0136128 A1* | 6/2006 | Chen | 701/210 |
| 2006/0178813 A1* | 8/2006 | Chen | 701/202 |
| 2007/0001875 A1* | 1/2007 | Taylor | 340/995.24 |
| 2007/0260393 A1* | 11/2007 | Abernethy et al. | 701/201 |
| 2008/0024364 A1* | 1/2008 | Frederick Taylor | 342/357.13 |
| 2008/0091796 A1* | 4/2008 | Story et al. | 709/217 |
| 2009/0143984 A1* | 6/2009 | Baudisch et al. | 701/300 |
| 2009/0265103 A1 | 10/2009 | Kostepen | |
| 2011/0106534 A1* | 5/2011 | Lebeau et al. | 704/235 |

FOREIGN PATENT DOCUMENTS

| | | |
|---|---|---|
| EP | 1 936 606 | 6/2008 |
| EP | 2 026 328 | 2/2009 |
| JP | 2000337911 A | 12/2000 |
| JP | 2001141501 A | 5/2001 |
| KR | 2002082510 A | 10/2002 |
| KR | 2009029518 A | 3/2009 |
| KR | 2009093444 A | 9/2009 |

OTHER PUBLICATIONS

International Search Report & Written Opinion for Application No. PCT/US2010/054578, dated Mar. 28, 2011, 13 pages.

Tezuka, Taro and Katsumi Tanaka, 'Temporal and Spatial Attribute Extraction from Web Documents and Time-Specific Regional Web Search System,' Web and Wireless Geographical Information Systems: 4th International Workshop, Nov. 2004, vol. 3428, pp. 14-25.

International Search Report & Written Opinion for Application No. PCT/US2010/052024, dated Jun. 10, 2011, 11 pages.

Authorized Officer M. Liebhart. International Search Report & Written Opinion in International Application No. PCT/US2010/054585, mailed Mar. 25, 2011, 11 pages.

* cited by examiner

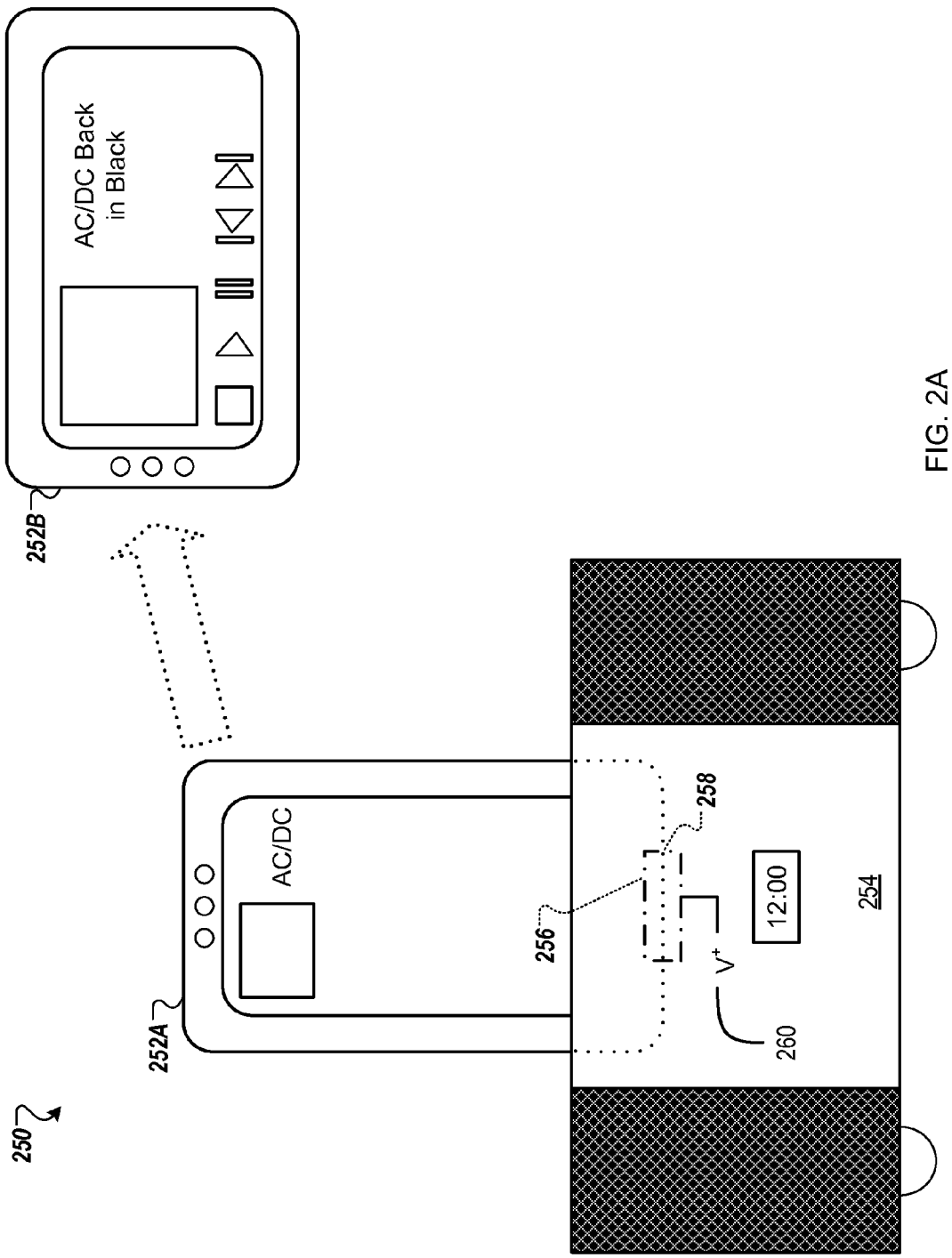

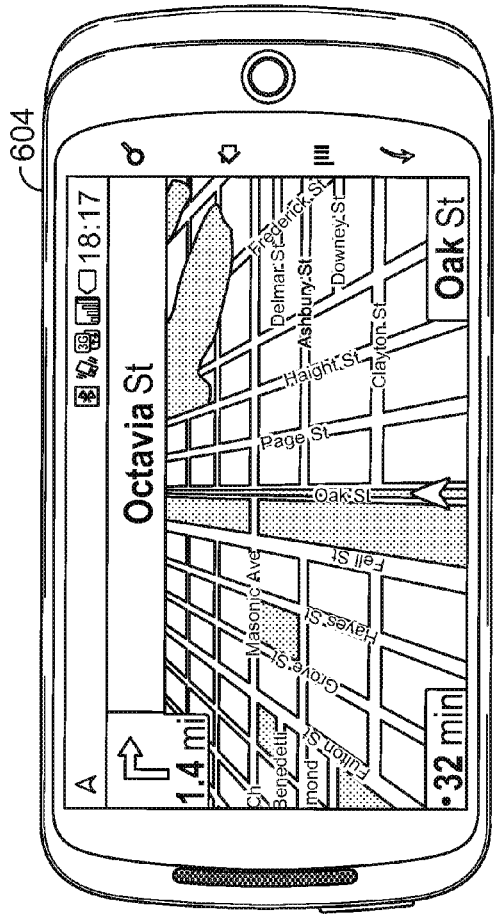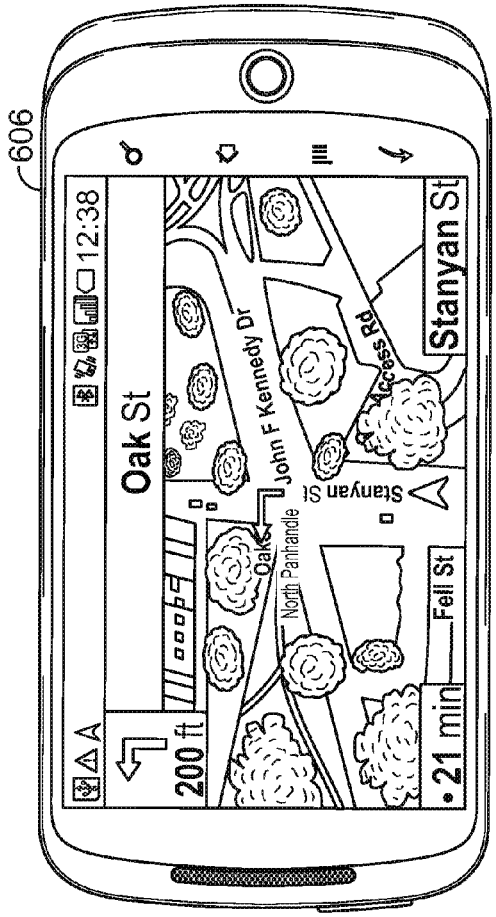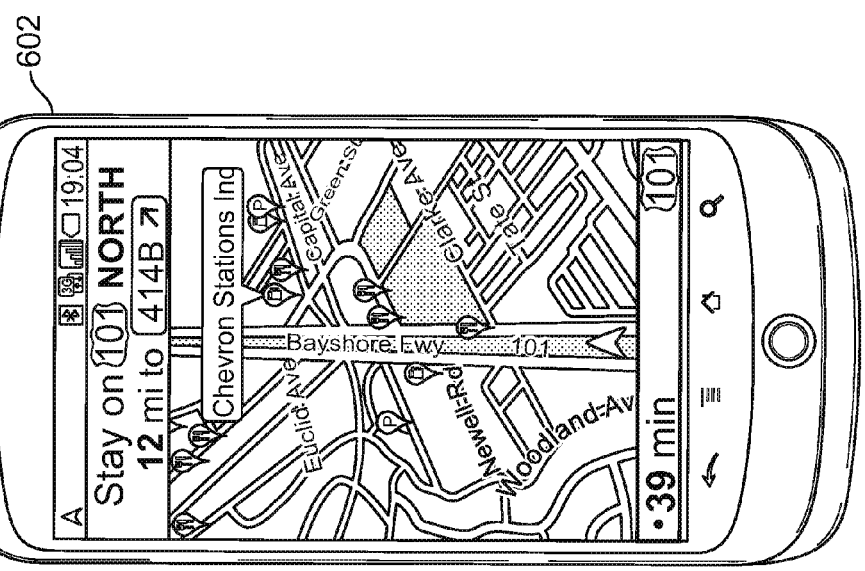

VOICE ACTIONS ON COMPUTING DEVICES

CROSS-REFERENCE TO RELATED APPLICATION

This application is a continuation application of U.S. application Ser. No. 12/914,965, filed on Oct. 28, 2010, and titled VOICE ACTIONS ON COMPUTING DEVICES, which claims the benefit under 35 U.S.C. §119(e) of U.S. Provisional Application Ser. No. 61/255,847, filed on Oct. 28, 2009, entitled "Search, Navigation, and Docking with a Mobile Computing Device," the entire contents of which are hereby incorporated by reference.

TECHNICAL FIELD

This document relates to actions that may be taken by or with a mobile computing device such as a smartphone, including by controlling a navigation application using voice inputs.

BACKGROUND

Mobile communication devices allow users to make telephone calls, receive email, browse the World Wide Web, listen to audio content, and view video content. Such devices have gotten more powerful over the years, to the point where they can now execute various custom, downloaded applications for a variety of needs. Many of the applications are very sophisticated and may access server-based data automatically while they are running so as to provide a rich user experience.

The number and type of sensors on smartphones has so proliferated in recent years. Many such devices now have electronic compasses, accelerometers, GPS units, cameras, proximity sensors, and other such sensors. These sensors can be used in a variety of manners, such as to determine a user's location with a GPS unit, and the user's orientation with a compass unit, and then to provide a compass-based GOOGLE STREETVIEW around the user. Other applications can provide basic turn-by-turn navigation in response to a user's provision of an address to a device. Also, dedicated navigation units permit a user to type in a destination address and to have turn-by-turn directions provided between the user's current location and the destination address.

SUMMARY

This document describes systems and techniques for conducting search (and particularly voice search) and navigation (including voice-based navigation) on a mobile computing device, and for performing actions associated with docking of a mobile computing device. In certain examples, a user can speak the name of a venue where they would like to travel, perhaps preceded by a control term, carrier phrase, or trigger term, such as "navigate to," and may have navigation instructions prepared automatically so that the computing device into which they spoke the destination name will automatically give them turn-by-turn directions (including with spoken directions, e.g., "turn right in 300 feet") from their current geographic location to the spoken venue. The spoken input may be transmitted by the device to a remote server system, which may identify the presence of the control term, and then use the presence of the control term in order to determine how to handle the rest of the spoken input or query. For example, the control term "navigate to" may cause the system to enter a textual version of the rest of the query to a local search engine, and may use the results to identify an address for the destination venue, and then in turn may determine a lat/long pair or other identifier that can be used as an endpoint for navigation directions (along with the current location of the user and their device, determined, e.g., using GPS functionality on the device). Such geographic location information may then be supplied to a further component of the system as an endpoint for a route, and the further component (a navigation engine) may provide navigation information back to a user of a mobile device. Such information may include data required to draw a standard route along a navigable route, to animate the path along the route as the user drives, such as with a moving dot over a map, with digital photographic images of the actual area along that route that has been previously captured by cars or other vehicles driving the route.

Navigation applications also can provide a presentation of navigation information in response to natural language queries from a user that do not include a location name. For example, a user can, instead of submitting the name of a point of interest, such as the name of a museum, request to be given directions to the "museum that is currently holding a Picasso exhibition." To generate endpoints for such a navigable route, a system may submit terms such as "museum currently holding Picasso exhibition" to a local search engine (e.g., using a public API for submitting queries), along with an indication of the user's current location. The search engine may then, according to its standard mode of operation, return various search results that are in the relevant area and responsive to the query. The system may then parse the search results, such as parsing landing pages that the search results point to, to identify geographic locations listed on the pages, such as addresses of museums. As one example, a top result may be the home page for the Hirshhorn Museum, and that page can be parsed for text that matches a format for an address, or can be searched for a further link such as "directions" or "contact us," and the target page may then be parsed to obtain address information that can then be converted to lat/long coordinates. Also, once the venue name is identified from the search results, it may be submitted to a structured database, such as a yellow pages or similar database that correlates business or venue names to addresses and telephone numbers.

The user's mobile device may also be programmed to listen for particular control terms even if the mobile device does not perform the speech-to-text conversion on the queries. The device may thus determine which server system to send the rest of the audio spoken query to, and to select the categories of meta data to send with the query. In this manner, "listening" by a device may be only local, so that information spoken by a user goes to a server system only when the user affirmatively speaks a relevant control term. When the device listens in this manner, it may also be hashing the input so as to preserve more privacy for the user, and may compare the hashed input to a pre-saved hashed version of the control term. In addition, the listening may be confined to the computing device in certain circumstances, and not shared with a separate server system. Moreover, a user may be required to press an on-screen icon on the device (such as a microphone) before the device will listen for speech input.

The words that the user speaks after those control terms may be supplied to the search engine as arguments for the relevant action that relates to the control terms. Other control terms may also be predefined for a system (e.g., by developers of an operating system for a device), or third parties may provide their own control terms that will be listened for by the system, according to an API that has been defined for such submissions. Third parties may also provide information for a syntax related to their control terms that may be used by the system to parse user input that is received along with the relevant control terms. As one example, a media player application may register the control term "listen to," along with a syntax that indicates that terms coming after the control term should be searched first, in tracks of music stored on the device, and second in the names of musical groups on the device. In addition, the grammar that is used to convert the remainder of a spoken input into text may be selected based on the control term that begins an input.

Various navigation output techniques are also described below. For example, navigation may be provided visually (and with audio prompts) using standard maps and also using aerial or satellite views, where the views may be modified slightly to make it appear as if they have been rotated forward away from the user to generate a three-dimensional effect on a user display. Additionally, or alternatively, street-level photographs that roughly correspond to a current location geographically of a user may be displayed to the user. A transition may be made automatically between map or satellite views on the one hand, and street-level views on the other, such as based on a speed of the user or a proximity of the user to an end point of a route. For example, a user may be shown street-level views when they slow down, under the assumption that they will be able to digest the street-level image data better at slower speeds. In addition, a user may be shown street-level images when they get closer to a endpoint, under the assumption that they will be looking carefully for their destination at such a point.

In addition, the angle of view for street-level views may change as the user approaches the end point. In particular, the angle of view may be forward down the road along most of the route, but may turn to the side of the road as the user approaches the end point, so that the user can more readily see buildings on the sides of the road to determine that they (the user) are at a right location. A view display to a user may be made up of multiple images, such as images previously captured at the location where the user is now at, and may be stitched together and distorted so as to emphasize certain areas, such as to fit a 180 degree front panorama on the user's display, to compress the image in front of the user, and to not compress the images to each side of the user (when the user is driving slowly), or to leave the forward-facing image uncompressed visually (when the user is driving faster).

In another navigation implementation, a mobile device may download and cache all of the street level images when a trip is first started, and may include local code for transitioning the images as the user moves, so that if the device's connection with a network is broken, the device can continue to show images all the way to the destination.

In one implementation, a computer-implemented method includes receiving spoken input at a computing device from a user of the computing device, the spoken input including a carrier phrase and a subject to which the carrier phrase is directed, providing at least a portion of the spoken input to a server system in audio form for speech-to-text conversion by the server system, the portion including the subject to which the carrier phrase is directed, receiving from the server system instructions for automatically performing an operation on the computing device, the operation including an action defined by the carrier phrase using parameters defined by the subject, and automatically performing the operation on the computing device. The carrier phrase can comprise an instruction (such as "navigate to") to execute a navigation application, and the subject can describe a geographical landmark, including naming the geographical landmark. The operation can comprise displaying turn-by-turn navigation in an application, wherein data for the turn-by-turn navigation is generated by the server system for a navigation route from a current location of the computing device to a location described by the subject. Also, the prefix can comprise an instruction to play a media file, and the subject describes the media file to be played.

In some aspects, the subject includes a name of content in the media file, and in others, the subject comprises a search query and the prefix identifies operations to be conducted on search results for the search query. The operations can be conducted on the search results by parsing a landing page corresponding to a search result for a designated type of information. Also the designated type of information can comprise a location.

In another implementation, a computer-implemented method comprises receiving, at a computer server system from a remote computing device, audio spoken by a user of the computing device, the audio including a subject to which a spoken carrier phrase form the user was directed; performing speech-to-text conversion on the audio by the computer server system; generating data for execution on the computing device to cause the computing device to automatically perform an operation identified by the carrier phrase using the subject as a parameter of the operation; and transmitting the data to the computing device. The method can further comprise receiving a textual identifier of the carrier phrase, wherein the computing device identified the carrier phrase before providing the audio to the computer server system. Also, the method can additionally comprise using the identifier to select a grammar for performing the speech-to-text conversion. The carrier phrase can comprise an instruction (such as "navigate to") to execute a navigation application, and the subject describes a geographical landmark, and the subject can describe a geographical landmark without naming the geographical landmark.

In some aspects, the operation comprises displaying turn-by-turn navigation in an application, wherein data for the turn-by-turn navigation is generated by the server system for a navigation route from a current location of the computing device to a location described by the subject. The prefix can also comprise an instruction to play a media file, and the subject describes the media file to be played, and the subject can include a name of content in the media file.

The subject can alternatively or in addition comprise a search query and the prefix identifies operations to be conducted on search results for the search query, and the operations to be conducted on the search results can comprise parsing a landing page corresponding to a search result for a designated type of information. In certain implementations, the designated type of information comprises a location.

In yet another implementations, one or more tangible non-transient machine-readable media are disclosed that store instructions. The instructions, when executed, perform actions comprising receiving spoken input at a computing device from a user of the computing device, the spoken input including a carrier phrase and a subject to which the carrier phrase is directed; providing at least a portion of the spoken input to a server system in audio form for speech-to-text conversion by the server system, the portion including the subject to which the carrier phrase is directed; receiving from the server system instructions for automatically performing an operation on the computing device, the operation including an action defined by the carrier phrase using parameters defined by the subject; and automatically performing the operation on the computing device.

The details of one or more embodiments are set forth in the accompanying drawings and the description below. Other features and advantages will be apparent from the description and drawings, and from the claims.

DESCRIPTION OF DRAWINGS

FIG. 2A shows a music docking system and a mobile computing device in the form of a touchscreen smartphone.

FIGS. 6A-6E show example screen shots of a smartphone-based navigation application.

Like reference symbols in the various drawings indicate like elements.

DETAILED DESCRIPTION

Figure 1:
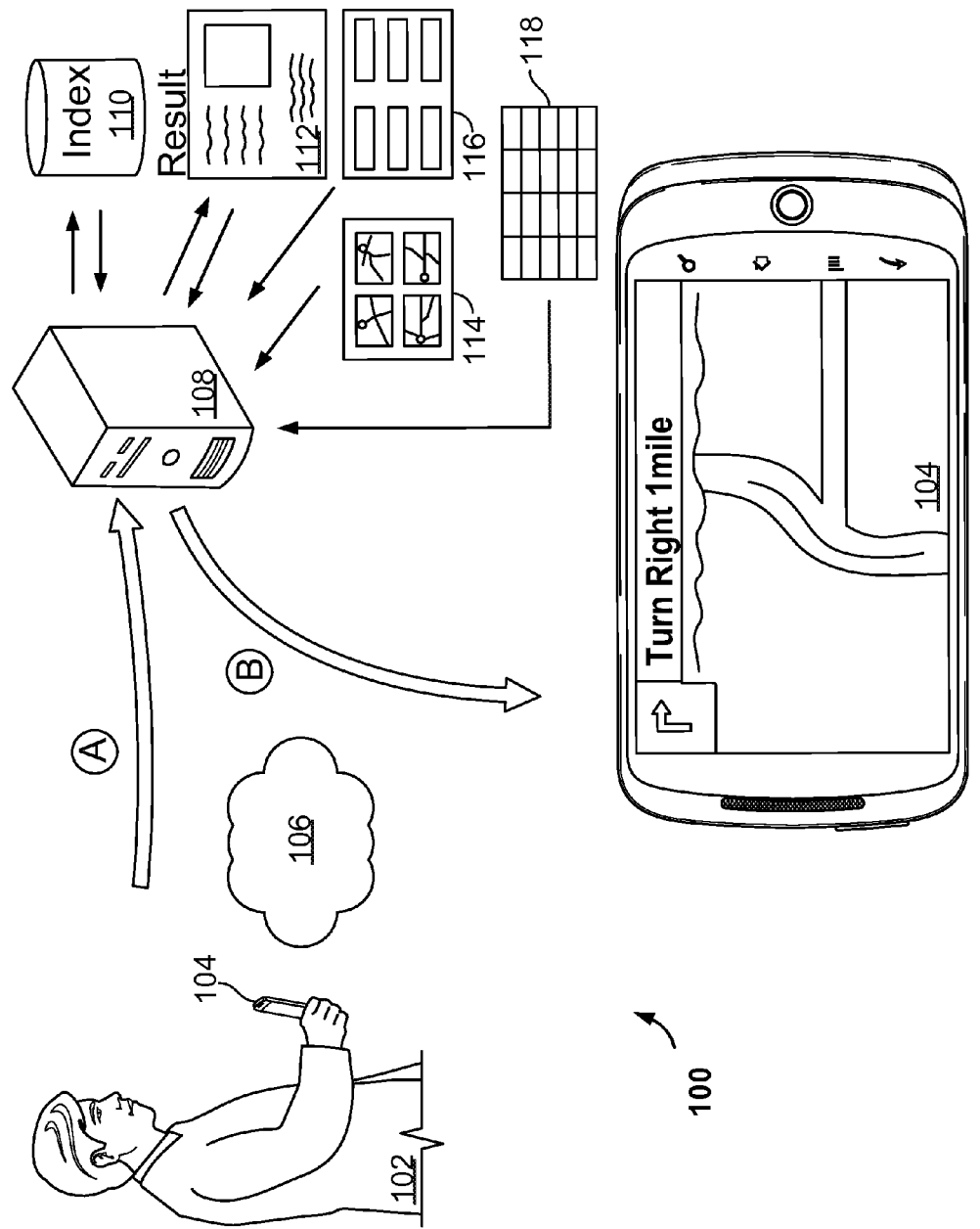
FIG. 1 shows a conceptual flow of information in a navigation system that responds to spoken natural language queries and provides street level imaging for navigation.

This document describes systems and techniques for providing navigational assistance (e.g., driving directions), including in response to spoken queries, and using various graphical techniques. The spoken input may be preceded by a carrier phrase and may include non-traditional content, such as a phrase that does not include an address or name of a location or venue—e.g., "Directions to a nearby coffee shop." Audio of some or all of the spoken input may be transmitted to a server system that is remote from the computing device on which the input was received, and the server system may convert the audio to text, generate results to a query in the spoken input, and then further perform operations to provide the computing device with program code that is not simply a search result for the input. For example, the example query may be parsed to generate a query of "coffee shop," and the term "nearby" may be used as meta data to ranked results for the search so that closest shops rank more highly.

A landing page for the best result may then be accessed (e.g., by accessing a DOM for the page) and location-related information such as addresses may be identified and parsed from it. The location-related information may then be used to look up a lat/long pair, and to then infer a location for the result that the user intended. The system may then pass information or begin passing information for the generation and continuation of a turn-by-turn navigation application on the computing device, so that as the device reports in new geographic locations, the device may be caused to update a map or other view and to generated verbal driving directions.

The search by a central system may also generate a variety of search results, which may be displayed normally in the form of snippets that point to landing pages, which are the actual webpages that a user may go to in response to seeing search results and clicking on one of the results. In this example, the system may parse the landing pages, or the landing pages may have previously been parsed, to identify an address or other location information associated with the landing page. Various mechanisms may be used to determine if an adequate level of certainty for a result has been met before returning information to a user, and ultimately the address information may be provided to a navigation application as an endpoint for a route for the user. In other examples, where there are multiple search results and corresponding locations, the user may be presented with a list of the results, along with their addresses, and the user may select one of the results as an endpoint for navigation route. Thus, for example, the provision of navigation information to a user may be made an user-selectable option for search results for which the system was able to determine a geographical address, such as by placing a "navigate to this result" or similar link with the particular result in a list of results.

When a user determines to receive navigation directions, the particular presentation on the device may take the form of a map on which a moving dot is displayed that represents the current location of the computing device, in coordination with the user's motion along a predetermined path between two points. A map or similar cartoonish representation may be provided to show the route between points, and a user's progress may be indicated such as by placing an icon at the center of the screen that represents user movement with the device and vehicle.

In examples here, such presentations may be made, and it may also be supplemented with satellite views of an area and street-level views of the area around the user as they navigate, or an area ahead of the user a sufficient distance so that the user can be given a preview of where they are heading along the path. Thus, for example a user may visually identify information for a trip, and a central system may identify a starting point for the trip, and then compute a path between the starting point and the ending point, where the starting point is typically the current location of the user. The system may then download information that is needed to provide a traditional display of navigation information for the user (e.g., as turn-by-turn directions), and may also download to the user's device a large plurality of digital photographic images along the route, where the images were previously captured by photographers who had driven along portions of the route, such as by the well-known GOOGLE STREET-VIEW service.

Various types of information may be displayed to a user in various ways as they move along a path. For example, the user may manually choose to display either map information or satellite information depending on the level of detail and screen clutter they would like to see. The user may also drop the display of data down to see street-level views, either manually or automatically. Automatic transitions to or from street level may be based, for example, on a current speed of the user or proximity of the user to the starting or ending point. In particular, when a user is going relatively slowly it may be preferable to show the user a street level view, and the same is true when the user is close to a starting or ending point. Also, a user may prefer to see a view to the side when they are close to an end point so that they can see the particular building they are supposed to stop in front of.

Where images along a route are provided, they may be fetched from the server system, either all at the beginning of the trip, as the computing device moves along a route, or in batches along the route. The images may be smoothly transitions one-to-the-next as the mobile device traverses a path so as to give the user a sense that they are looking out their windshield or windows (and the images should match what the user sees around him or her in any event, in a manner similar to augmented reality). The system may also transition between different display types—for example, starting with a map view for most of a trip, but moving to a STREETVIEW street-level image view when the user slows down or nears a destination.

Particular implementations of the concepts discussed here are provided with respect to each of the accompanying figures.

FIG. 1 shows a conceptual flow of information in a navigation system that responds to spoken natural language queries and provides overhead and street-level imaging for navigation. In general, the system 100 receives input from a user 102 of a mobile computing device 104, such as in the form of spoken query inputs. The system 100 may use a server system 108 that is remote from the device 104 and can interpret the spoken inputs to provide information back to the device 104 for displaying a turn-by-turn navigation application, such as from a determine the current location for the user 102 to a location that is reflected (implicitly or explicitly) in the spoken query that the user 102 provided.

Referring more specifically to components in the figure, the user 102 may be an owner of the device 104 and may have previously logged the device 104 into a user account at the server system 108 (so that the device 104 can be identified by the server system 108 on subsequent submissions), through a network such as the Internet 106. The server system 108 may include one or more servers that may provide a variety of services, such as search, mapping, electronic mail, and navigational aids.

The submission of a query from the device 104 to the server system 108 is indicated by Arrow A in the figure. The submission may be in the form of a natural language spoken query that is preceded by a carrier phrase. For example, where the user wishes to receive directions to a particular geographic location, the preceding carrier phrase may be "navigate to." The remainder of the query may include a name of a location, such as "123 Main Street" or "Bob's Steak House," or may include information that does not explicitly identify the locations, such as "the best steakhouse in this town."

At the server system 108, the submission may be converted by standard speech-to-text techniques to identify the query that indicates the action to be taken. For example, the carrier phrase "navigate to" may initially be identified in order to determine what actions to take in responding to the device 104. Such action may include determining one or more locations for the navigation, so as to be able to generate a route and route map data to return to the device 104.

The remainder of the spoken input (after the carrier phrase or control words) may be used as an argument or parameter for that action. In one example, when an explicit identifier for a location is provided (e.g., "Bob's Steak House"), a look-up may be performed to identify an address for that location, and then by extension lat/long coordinates for the location. Where an explicit identifier is not provided, the text for the query may be passed to a search engine that is part of the server system 108, which may search content in the search engine index 110. For example the search may be conducted on a corpus of information for an area that is around the current location of the user 102. Plus, for example, a current location of the device 104 that is received in the transmission indicated by Arrow A may be used to identify the location of the user 102, and the remainder of the text may be used to identify and rank search results for that location.

In the stated example for a steakhouse, one search result may be indicated as being better than all the others because the webpage for the associated restaurant (the landing page for the search result) indicates that it is the best steakhouse in the particular city, and other web pages may point to that web page and contain similar language. Such information may cause that result to have a higher relevance for the query than for best steakhouses in other locales, or local web pages that do not mention best steakhouses.

The determination of the action to be performed in response to a spoken import, although described here as occurring on the server system 108, may similarly occur on the device 104. At the same time, speech-to-text conversion of the remainder of the query may occur on the server system 108. Thus, for example, the device 104 may have a small grammar of items that it listens for, where those items include carrier phrases that have been assigned to the device 104 or have been added by the user 102 of the device 104. Other such carrier phrases may include "listen to," for a user indication that they would like a media player on the device 104 to play a song whose title is spoken by the user after the carrier phrase, "play," to indicate that the user would like a song or other media file played on the device 100 for, "go to," to indicate that the user would like a Web browser on the device 104 to automatically navigate to a web page that best matches the name of whatever term the user speaks after the carrier phrase, and other appropriate carrier phrases.

Where the device 104 identifies the carrier phrase initially, it may provide relevant metadata to the server system 108 based on its determination of the carrier phrase. For example, where the carrier phrase is "navigate to," the device 104 may include information that indicates a current geographic location of the device 104 obtained from GPS functionality on the device 104. Such metadata that may be passed in the communication indicated by Arrow A may assist the server system 108 in preparing information to return to device 104, to enable device 104 to display a navigation application properly.

Referring now to the actions of the server system 108 in providing navigation information back to device 104, when a result has been identified, a geographic location for that result may be determined. As one example, a landing page for a result may include an address or a commonly labeled link (e.g., "about us," "directions," or "contact us") to a page that includes an address. Such information may be parsed from the page, either at the time the user enters the query or at a prior time (and stored in a structured database). Alternatively, a name of a result, such as the name of a business, may be submitted to a look-up table that correlates venue names with locations. In this manner and others, the server system may generate a location that corresponds to a received query that does not include an explicit identification of a location such as by an address or venue name.

When the server system 108 has identified a location for the query (i.e. a destination for the navigation), it may generate a route between the device's current location and the determined destination location for the query. The server system 108 may then collect map tiles 114 that are stored at the server system 108 for providing to the device 104, and may also collect street-level digital images 116 that were previously taken at points along the route. In addition, the server system 108 may gather other information, such as information 118 for generating annotations to be overlaid on a display while a user is on the route. Such information may include geographical information for gas stations and other points of interest along the route, so that user-selectable pins or other icons can be superimposed or annotated on to a display of the route, and may be selected by the user if they would like to learn more information about those particular objects.

In certain implementations, a best search result for the query entered by the user may be determined, and navigation information may be provided to the user immediately, particularly when the confidence that the result is correct is high. In other implementations, a best result may be determined, and before the server system 108 performs other operations, it may return a description of that result (e.g., a name the steakhouse that it determined to be the best in the area) to the device 104 so that the user can confirm whether the system has found the destination that the user intended. For example, if the user asks for the best steakhouse in town, and the system selects a fast food restaurant, the user may be shown a selectable control to see the next search result. In certain implementations, the first result may be displayed to the user 102 with a countdown timer of approximately 5 seconds, so that if the user 102 does not affirmatively decline the first identified result, navigation information for that result will automatically be delivered to the device 104 when the countdown timer expires. As shown below for the example of device 104, when the server system 108 can provide relevant information, a standard turn-by-turn navigation implementation may be displayed on device 104, and may be accompanied by spoken directions generated on the device 104.

As discussed more fully below, various implementations may be achieved in the display of the navigation operation to a user. For example, the provision of map tiles or other drawn items, in addition to photographs along a route, may enable a better display for a user of the device 104. For example, map tiles or similar drawn representations may be shown at some points along the trip, while photographs of a route may be shown at other locations. As one example, photographs may be shown as users arrive at their destination, so that they can better compare what they see in real-life at a street-level view with what they see in their navigation application from the street-level view, such as storefronts.

Also, the map tiles along a route and on a reasonable distance on each side of the route, in addition to relevant digital images taken from street level, may be pre-cached on the device at the time the user requests that navigation directions. The items may then be served locally from the device 104 as the user moves along a route. In this manner, the relevant graphical items that are needed for the navigation application may all be stored in a relatively small space (as compared to storing all of the data for a large geographic area) on the device 104, and the navigation application may continue to work even if the user 102 loses connection to a network. Such a feature may be particularly beneficial where network outages are common, or where a user is making use of a device that may have WiFi or similar capabilities, but not 3G or 4G cellular capabilities.

Using the techniques discussed here, a user of a mobile computing device may easily receive user inputs (including spoken inputs) for performing various operations, including generating navigation directions, and may be provided with results that are directed toward the particular operation they requested and at the particular data that they requested to be processed for the operation. The presentation of the data may be provided automatically and may be presented in a way that is particularly useful for a user of the device.

FIG. 2A shows a music docking system 250 and a mobile computing device in the form of a touchscreen smartphone. This figure shows schematically a system in which a wired electrical connection is made upon docking the device, and the electrical connection triggers other actions on the device to occur. In the figure, the dock 254 takes a familiar form of an appliance that can be plugged into a standard electrical outlet and that includes amplifiers and speakers, among other things, and is generally a home music dock for a mobile computing device such as a music player or smartphone.

The actions that may be triggered include switching modes or states of the device automatically upon docking the device or undocking the device, including where the mode into which the device switches depends on the type of the dock. For example, a device may take on a particular theme or mode when it is docked into a music-playing dock like that shown in the figure, including by forming a BLUETOOTH link with the dock for the playing of music over speakers in the dock. When the device is placed into a car-related dock, in contrast, the device may take on a different theme, including by launching a mapping or navigation application, and also providing audio output to a speaker on the dock or forming a BLUETOOTH connection with an audio system in the vehicle, if there is such a system in the vehicle.

A first device state 252A of the mobile device is shown when the device is physically connected to the dock 254, and a second device state 252B is shown when the device has subsequently been undocked. A charging mechanism is shown schematically in the figure by supply voltage 260 that is provided through a physical docking connector 258 to recharge batteries in the device and to allow the device to operate when it is docked. The dock 254 also has a display that can show a time, or status relating to the dock 254, including via information that is received from the device.

Figure 2B:
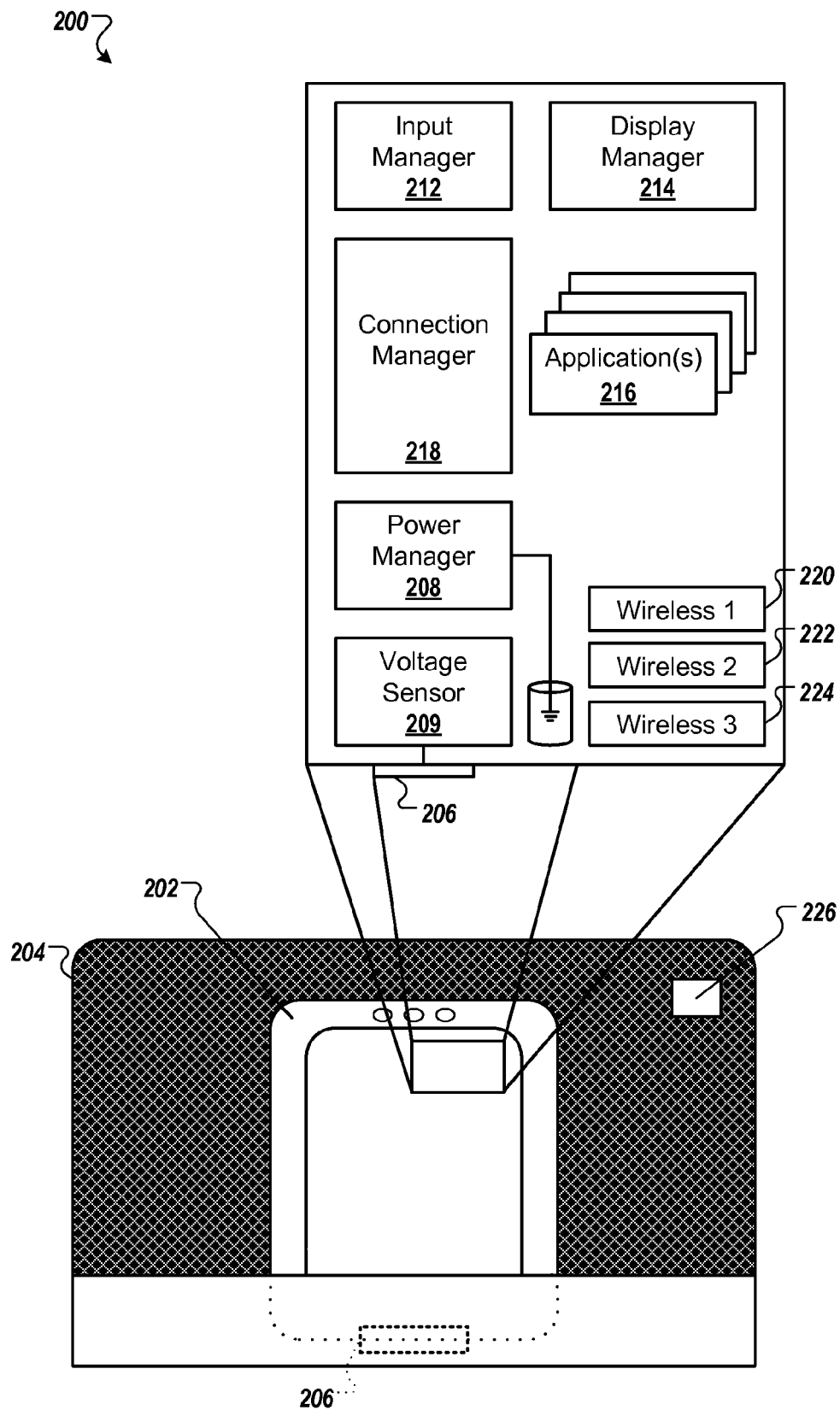
FIG. 2B shows a schematic diagram of a docked mobile computing device.

FIG. 2B shows a schematic diagram 200 of a docked mobile computing device 202. In general, the schematic diagram 200 shows various components that may be provided on the device 202 so as to manage the switching of modes on the device 202 based on the status of the device 202 being undocked or docked to particular types of docks.

An input manager 212 in the device manages input to the device, including touch input to a screen on the device. The input manager 212 may correlate such input with applications being displayed on the device so as to allow a user of the device to launch and interact with such applications and with components of an operating system executing on the device. A display manager 214 coordinates with the touch manager and controls what items are displayed in what positions, which will be shown over the top of other items, and which will be shown as having the device's focus at a particular time.

A connection manager 218 manages docked and wireless connections for the device, such as in the manners discussed above. For example, the connections manager 218 may infer a context for a device based on the manner in which it is docked, and may notify various applications 216 that may be run on a processor of the device 202, including navigational applications that are discussed more fully above and below. A power manager 208 and voltage sensor 209 cooperate to determine when a device has been plugged into a power source, and also to determine when certain activities may occur on a device after it has been plugged in. The device 202 may also determine that it has been docked (e.g., physically plugged into physical docking connector 206), and may determine a dock type for the dock, using electrical or magnetic connections between the device and the dock—where the presence of connections at particular locations represent the type of dock, or where data may be transmitted (e.g., serially) over the connections so that the device can interrogate the dock or otherwise determine the dock type. Finally, various wireless interfaces 220-224 may be employed by the device 202 in order to communicate by a variety of modes, such as BLUETOOTH, WiFi, 3G, and other cellular connections.

Figure 3:
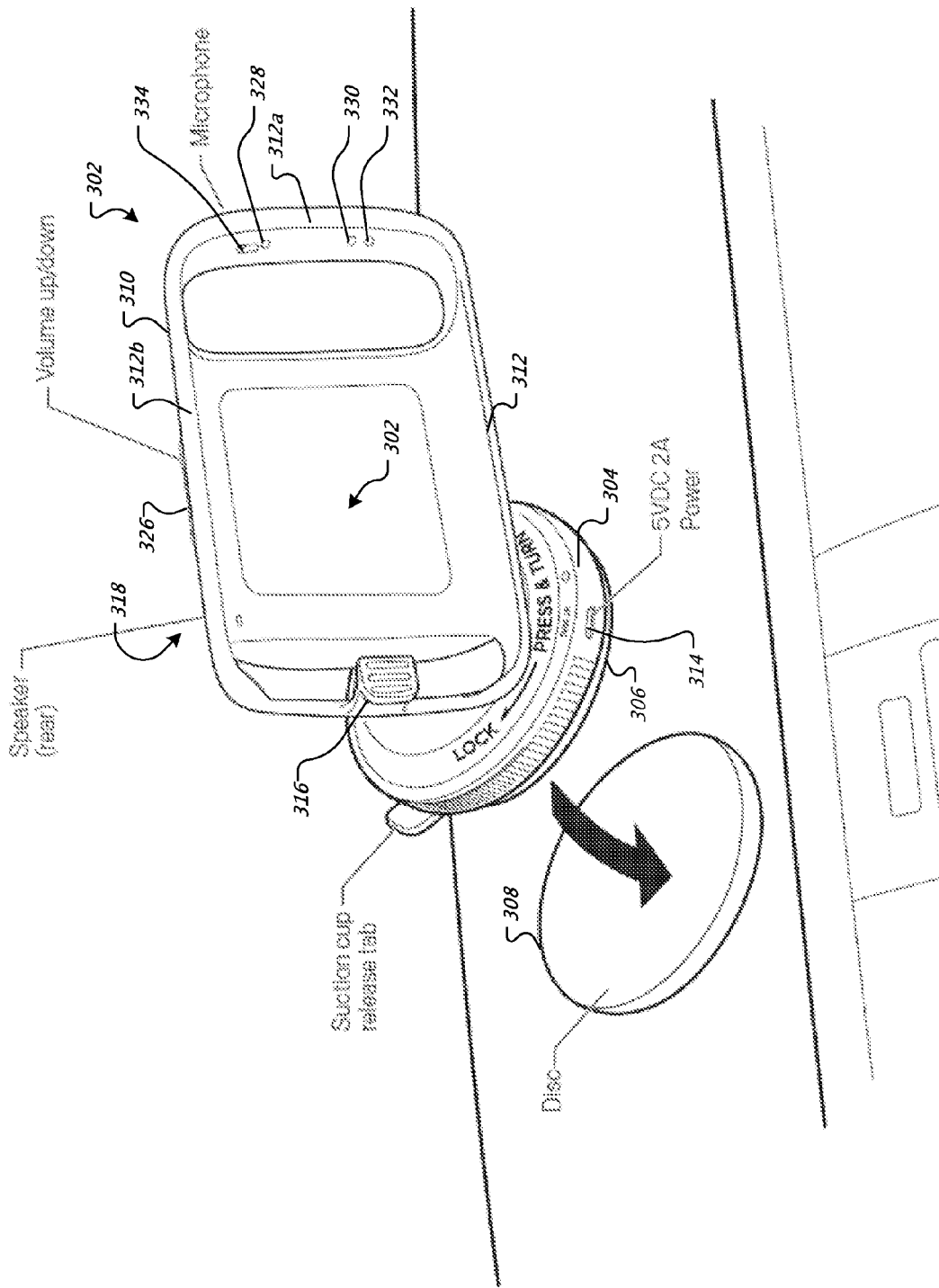
FIG. 3 shows an example car dock for a mobile computing device.

FIG. 3 shows an example car dock for a mobile computing device. In this figure, the car dock 302 includes a base 304 for mounting the car dock 302 to a surface (e.g., a car dashboard, a car windshield, a desk, or a wall). The base 304 may include a suction cup 306 that enables the base 304 to mount to consistent surfaces. A disk 308 can be adhesively attached to an uneven surface (e.g., a rippled car dashboard) to provide a consistent surface for the dock. Such mounting mechanisms may be used to mount the dock 302 to a windshield of a car so that a display on the device is aiming toward a driver of the car, and so that the drover may conveniently employ various applications including navigational applications.

The base 304 connects to the docking body 310 via a rod. A first end of the rod connects with the base 304 using a ball joint, while a second end of the rod connects to the docking body 310 with another ball joint. Thus, the docking body 310 may be pivoted to face different orientations, and may rotate between landscape and portrait orientations.

The docking body 310 includes a recessed inner portion 302 that is surrounded by a wall 312. The recessed inner portion 302 and the wall 312 are shaped to correspond to a particular model of mobile computing device. A lower wall 312a and a retractable top latch 316 may at least partially enclose a front surface of the mobile device in order to constrain the mobile device to the dock 302. In some examples, the side walls 312b may not partially enclose the front surface. In other words, the walls may not circumferentially wrap more than half-way around a narrow portion of the mobile device.

The car dock 302 may include a female USB jack 314 to receive a USB cord (not shown) that supplies power, and in some examples, data. The car dock 302 also includes speakers 318 that radiate sound from a back side of the dock. In some examples, the speakers play audio that has been wirelessly transmitted from a mobile device to the dock, such as spoken turn-by-turn navigation commands. A volume rocker switch 326 allows a user to adjust the volume of audio that is output by the speakers 318. The car dock 302 also includes a microphone 334. The dock microphone 334 may have acoustic qualities that are better suited for speakerphone operation than a microphone of a mobile device that is received in the dock. Thus, the dock 302 may wirelessly transmit, to a docked device, an audio signal that is received using the dock microphone 334.

A first pin 332 provides a positive voltage electrical signal to a docked device. A second pin 330 provides a reference voltage to the device. A third pin 328 may be used for serial data communication between the device and the dock 302. The pins 328-432 may be provided in a same spacing and orientation as the pins 306-310 of FIG. 3. In other words, the pins in both devices contact the same portions of a mobile computing device that is moved between the docks.

A device may be programmed to recognize the presence of electrical power when it is physically docked and, as a result of such recognition, to then begin a process of determining a sock type for the dock (e.g., music dock, car dock, etc.). Where the dock type is determined to be a music dock, a music application may be automatically launched on the device, and a BLUETOOTH connection made to begin passing audio from the device to the dock (where the connection may be maintained even after the device is removed from the dock). A similar action may occur for a car dock, but alternatively or in addition, a navigation application may be launched automatically and may display a map or other visual indication of the user's current location (as determined, e.g., from a sensor unit on the device that includes GPS functionality) and may receive input for a destination location, in manners described above and below, so as to automatically begin providing to a user turn-by-turn directions or other navigational instructions.

In certain instances, the device may be programmed to automatically obtain or provide certain information through the dock or with a system that is associated with the dock, in response to being docked. For example, when the dock is in an automobile, the device may obtain information about the current status of the automobile, including the current RPMs of the automobile, the gear in which the automobile is operating, a speed of the automobile, the status of air-conditioning and entertainment systems in the automobile, and other information. In addition, the device may be programmed to operate as a partial or complete head unit for an entertainment system in the automobile (or a screen in the car can act as a head unit for the device). For example, the automobile may be provided only with amplifiers, speakers, and associated hardware, but not input and output mechanisms. The mobile computing device may serve the role of the input and output mechanisms, and may also provide for encoding and decoding of digital music and other such common operations. In this way, an owner of an automobile may be able to update the interaction of their car stereo by updating software on the mobile computing device, and may customize the way that their entertainment system in their automobile interacts with them. Also as the user acquires newer mobile computing devices, the user's experience with their mobile entertainment system in their automobile may improve. Moreover, the user may have a preferential experience because the user interface that they face will not be different or substantially different between their interaction when they are at home or walking around, as compared to when they are driving their automobile. The mobile computing device may also act as a supplemental interface for an interface that is part of the automobile. For example, the automobile may provide for radio station selection and other common actions, while the mobile computing device may provide for selection of particular song titles or other media files that are stored on the mobile computing device.

As yet another implementation relating to docking, separate wired and wireless connections may be made between a mobile computing device and a dock, or a device associated with a dock, when the mobile computing device is physically docked. The wired connection may be a power connection in a familiar manner, and may be used to recharge the mobile device while it is docked. A wired data connection could also be provided, but that data connection will be broken if and when the mobile computing device is removed from the dock. Thus, as an alternative to, or in addition to, the wired data connection, a wireless data connection may be formed automatically when the docking occurs. Such a connection may be used to transfer files or other information between the mobile computing device and the dock or a device associated with the dock, even after the device has been undocked.

Thus, for example, a user may dock their portable computing device to a music or video system, and a wireless handshaking negotiation may occur to establish a data link between the wireless computing device and the dock. The user may then choose to begin playing a media file, and the media file may play through the dock such as when the dock is a speaker system, or through a device associated with the dock, such as a video monitor connected to the dock, where the dock provides for television playing, recording, and similar functions, such as personal video recorder functions. After a time period, the user may want to take the mobile computing device with them but continue playing the media file or files that are stored on the mobile computing device. The user may thus undock the device, and the data transmission may continue over the wireless interface between the mobile computing device and the dock. With the device undocked, the user may employ the device like a remote control, such as by moving throughout the user's home and changing media files, adjusting volume levels, changing rooms in which the media will be played, or other similar actions.

Figure 4:
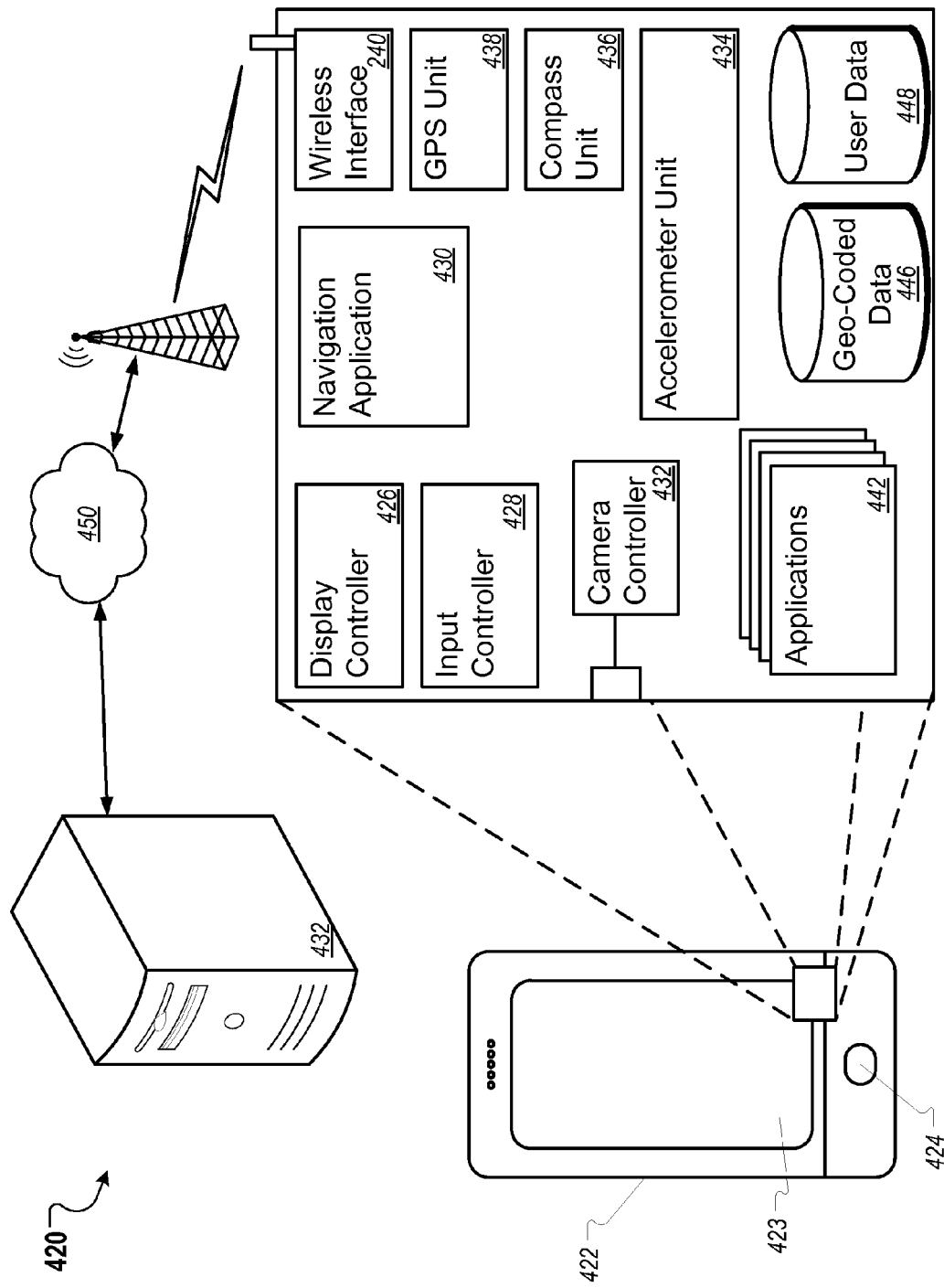
FIG. 4 is a schematic diagram of a system for providing navigation information to a user of a mobile device.

FIG. 4 is a block diagram of a mobile device 422 and system 420 for providing navigation information to a user of the device 422. In general, the system 420 includes software operating on the device 422 in cooperation with software at a server system 432 executing a hosted version of a navigation application. In such an example, the device 422 may interact with a user, and may transmit information for various pieces of the processing to be performed on the server system 432, such as speech-to-text conversion, converting search queries into geographic locations such as in a lat/long format, and serving map tile or images in coordination with data that may permit a navigation application 430 executing on the device 422 to interact with a user in the manners described above and below.

In the example shown, the mobile device 422 is a smart-phone. In other implementations, the mobile device 422 can be a personal digital assistant, a laptop computer, a net book, a camera, a wrist watch, or another type of mobile electronic device. The mobile device 422 includes a camera and a display screen 423 for displaying text, images, and graphics to a user, including images captured by the camera. In some implementations, the display screen 423 is a touch screen for receiving user input. For example, a user contacts the display screen 423 using a finger or stylus in order to select items displayed by the display screen 423, enter text, or control functions of the mobile device 422. The mobile device 422 further includes one or more input devices such as a track ball 424 for receiving user input. For example, the track ball 424 can be used to make selections, return to a home screen, to scroll through multiple items in a group, or to control functions of the mobile device 422. As another example, the one or more input devices includes a click wheel for scrolling through menus and text.

The mobile device 422 includes a number of modules for controlling functions of the mobile device 422, including modules to control the receipt of information and triggering the providing of navigation services to a user of the mobile device 422. The modules can be implemented using hardware, software, or a combination of the two. The mobile device 422 includes a display controller 426, which may be responsible for rendering content for presentation on the display screen 403. The display controller 426 may receive graphic-related content from a number of sources and may determine how the content is to be provided to a user, similar to the display manager 214 in FIG. 2B. For example, a number of different windows for various applications 442 on the mobile device 422 may need to be displayed, and the display controller 426 may determine which to display, which to hide, and what to display or hide when there is overlap between various graphical objects. The display controller 426 can include various components to provide particular functionality for interacting with displayed components, which may be shared across multiple applications, and may be supplied, for example, by an operating system of the mobile device 422.

An input controller 428, which may be the same as or similar to the input manager 212 of FIG. 2B, may be responsible for translating commands provided by a user of mobile device 422. For example, such commands may come from a keyboard, from touch screen functionality of the display screen 423, from trackball 424, or from other such sources, including dedicated buttons or soft buttons (e.g., buttons whose functions may change over time, and whose functions may be displayed on areas of the display screen 423 that are adjacent to the particular buttons). The input controller 428 may determine, for example, in what area of the display commands are being received, and thus in what application being shown on the display the commands are intended for. In addition, it may interpret input motions on the touch screen 423 into a common format and pass those interpreted motions (e.g., short press, long press, flicks, and straight-line drags) to the appropriate application. The input controller 428 may also report such inputs to an event manager (not shown) that in turn reports them to the appropriate modules or applications. For example, a user viewing an options menu displayed on the display screen 423 selects one of the options using one of the track ball 424 or touch screen functionality of the mobile device 422. The input controller 428 receives the input and causes the mobile device 422 to perform functions based on the input.

A variety of applications 442 may operate, generally via a common microprocessor, on the mobile device 422. The applications 442 may take a variety of forms, such as mapping and navigation applications, e-mail and other messaging applications, image viewing and editing applications, video capture and editing applications, web browser applications, music and video players, and various applications running within a web browser or running extensions of a web browser. In certain instances, one of the applications, a navigation application 430, may be programmed to communicate information to server system 432 via network 450.

A wireless interface 440 manages communication with a wireless network, which may be a data network that also carries voice communications. The wireless interface 440 may operate in a familiar manner, such as according to the examples discussed below, and may provide for communication by the mobile device 422 with messaging services such as text messaging, e-mail, and telephone voice mail messaging. In addition, the wireless interface 440 may support downloads and uploads of content and computer code over the wireless network. The wireless interface 440 may also communicate over short-range networks, such as with other devices in the same room as device 422, such as when results are provided to the device 422 and need to be forwarded automatically to another device in the manners discussed above and below.

A camera controller 432 of the mobile device 422 receives image data from the camera and controls functionality of the camera. For example, the camera controller 432 can receive image data for one or more images (e.g. stationary pictures or real-time video images) from the camera and can provide the image data to the display controller 426 and/or to one or more of the application 442.

Still referring to FIG. 4, in accordance with some implementations, the navigation application 430 uses a GPS Unit 438 of the mobile device 422 to determine the location of the mobile device 422. For example, the GPS Unit 438 receives signals from one or more global positioning satellites, and can use the signals to determine the current location of the mobile device 422. In some implementations, rather than the GPS Unit 438, the mobile device 422 includes a module that determines a location of the mobile device 422 using transmission tower triangulation or another method of location identification. In some implementations, the mobile device 422 uses location information that is determined using the GPS Unit 438 to identify geo-coded information that is associated with the location of the mobile device 422. In such implementations, location information obtained or determined by the GPS Unit 438 is provided to the navigation application 430. In some implementations, the navigation application 430 uses the location information to identify geo-coded data 446 stored on the mobile device 422.

The geo-coded data 446 includes information associated with particular geographic locations. For example, geo-coded data can include building names, business names and information, historical information, images, video files, and audio files associated with a particular location. As another example, geo-coded data associated with a location of a park may include hours for the park, the name of the park, information on plants located within the park, information on statues located within the park, historical information about the park, and park rules (e.g. "no dogs allowed"). The geo-coded information can also include map tiles or digital images to be displayed to a user of the device 422.

The navigation application 430 can use the current location of the mobile device 422 to identify information associated with geographic locations that are in close proximity to the location of the mobile device 422, such as for annotating a display of a navigation application with information such as information for local businesses that a user may want to visit. In some implementations, the geo-coded data 446 is stored on a memory of the mobile device 422, such as a hard drive, flash drive, or SD card. In some implementations, the mobile device 422 may contain no pre-stored geo-coded data. In some implementations, none of the geo-coded data 446 stored on the mobile device 422 is associated with locations within relative proximity to the current location of the mobile device 422. The geographical information can be used in various ways, such as passing the data to the central server system 432, so that the central server system may identify a current location of the mobile device and thereby set that location as an initial location, or may know which navigation to pass to the mobile device 422 as the device moves.

The device 422 utilizes a compass unit 436, or magnetometer, in some examples, e.g., to determine a current viewing direction of a camera on the device 422, within the horizontal plane, of the camera. In other words, the compass unit 436 determines a direction in which a user of the mobile device 422 is looking with the mobile device 420. Viewing direction information provided by the compass unit 436 can be used if the device 422 passes an image to the server system 432, such as for purposes of the submitting a query to the server system 432, or for adding the image to a collage of images at the location from multiple users. In some implementations, the mobile device 422 further includes an accelerometer unit 434 or a gyroscope that may be further used to identify a user's location, movement, or other such factors.

Still referring to FIG. 4, in accordance with some implementations, the mobile device 422 includes user data 448. The user data 448 can include user preferences or other information associated with a user of the mobile device 422. For example, the user data 448 can include a number of locations that the user has visited recently so that those locations can be suggested over others by a navigation system (and can be added to a speech-to-text grammar if the user input is verbal). The user data 448 may also indicate the manner in which the user wants navigation information displayed. For example, the user may always want to see a map view or a satellite view, or the user may establish pre-sets so that maps views are displayed under certain conditions and street views are displayed under other conditions.

The navigation application 430, which may run in a browser or be a stand-alone application, can interact with the server system 432 in a variety of manners. For example, in collecting spoken input from a user, the device 432 may provide a general application in the operating system for converting spoken input to text. The server system 432 may recognize a carrier phrase in the input and may use that carrier phrase to select an application to which the input was directed, and may pass an identifier for the application (e.g., the navigation application 430 is the carrier phrase was "navigate to") back to the device 423 along with the rest of the input in textual form. The navigation application may then pass the text back up to the server system 432 as a query that can be analyzed by the server system 432 to identify, e.g., a target for a navigation. Alternatively, the server system may perform the text-to-speech and determine the location information without first passing the text back to the device 422. The navigation application 430 may then wait to receive code and other data for interacting with the user for the navigation, such as in the manners discussed above and below. For example, the navigation application may receive map tiles or street-level images along with data specifying geographic locations for those objects. The navigation application may then use such information to generate an interactive navigation experience for the user of the device 422.

Figure 5A:
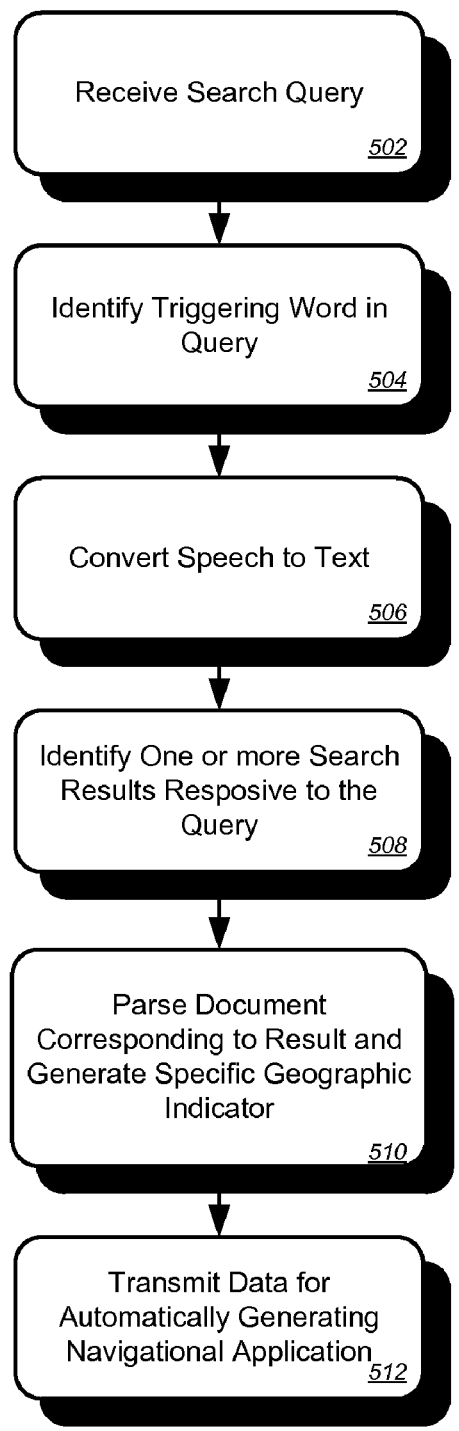
FIGS. 5A-5D are flow charts of navigation-related processes for performance on a smartphone or similar computing device.

FIGS. 5A-5D are flow charts of navigation-related processes for performance on a smartphone or similar computing device. FIG. 5A is a flow chart of a process for generating navigational information in response to spoken user queries. In general, the process involves receiving user queries that may be preceded by a carrier phrase such as "navigate to," and followed by a name of a location or an address, or alternatively, by a query that does not include a location name or address.

The process begins at box 502, where a search query is received. The query may be received initially at a computing device, and subsequently at a server system. The query may include a carrier phrase or triggering term that identifies the type or category of task that the user wants to have performed. For example, as indicated above, the term may be "navigate to," "go to," "listen to," "play," "pay" to indicate the name of a second user who should receive a transfer of payment such as in an electronic payment system, "send to" in order to automatically form a message such as an electronic mail message (where subsequent spoken terms may identify the content of the message), and the like. The query may also be received without a preceding carrier phrase, and may then simply be treated as a query that was intended to be an input to a standard search engine. In such a situation, a list of search results may be presented on a display of the device in a normal manner. As a result, ordinary voice search may be integrated with user-defined actions on a device.

At box 504, the triggering word or carrier phrase in the spoken input is identified. Such identification may occur on the mobile device or the server system, and may occur before or after all or a portion of the spoken input is converted to text from box 506. For example, a mobile device may monitor for carrier phrases when a user indicates affirmatively that they want such listening (e.g., by pressing a microphone icon on a display of the device), or may continuously monitor for spoken input while looking for a particular carrier phrase. When the mobile device hears a carrier phrase, it may begin saving subsequent spoken input, and when the subsequent spoken input ends, as recognized by a pause by the speaker, a file of the subsequent spoken input, which may be a query from the user, may be passed to the server system. In addition, metadata for the file may be passed with the input, and the particular metadata that is chosen by the mobile device to be passed, may be dependent on the particular carrier phrase that is spoken. For example, if the carrier phrase is "pay," a financial account identifier for a user of the device may be passed to the server system, so that the server system can automatically carry out the transaction. In contrast, when the carrier phrase is "navigate to," the additional data may be a current geographic location of the mobile computing device. The meta data may also be used to assist in the conversion from speech to text, such as by selecting a grammar that matches the particular speech-to-text conversion to be performed. For example, when the carrier phrase is "pay," words such as dollar, point, cents, and a count may be elevated in importance in a grammar. In contrast, when the carrier phrase is "navigate to," terms such as street, avenue, ordinal directions, names of states and towns, and other such information may be elevated in a grammar.

At box 508, one or more search results that are responsive to the query may be identified, such as at the server system. For example, a particular type of search may be performed based on the carrier phrase that was submitted, such as a local search or a search of a particular corpus such as a yellow pages, when the carrier phrase is "navigate to." In certain implementations, a list of search results may be returned by analyzing an index with the search engines, and the search results might not themselves contain location-related information. Thus, landing pages for the search results or other similar document related to each of the search results may be analyzed for geographic location-related information, such as in manners described above (box 510).

Once information that indicates a geographical location or address for a search result is obtained, and if the search result is determined to be a result to which the user's query was directed, the server system may begin gathering data for providing driving directions to the user. In some embodiments, a determination that an initially-identified search result is the intended result, can be confirmed by transmitting to the mobile device an identifier for the initially-identified result, and waiting for user action or inaction as a confirmation that the initial result is either right or wrong. In a particular embodiment, user inaction after a certain time period (e.g., several seconds) may be interpreted as an indication that the result is correct, and the navigation information may then be prepared for transfer to the mobile device.

At box 512, the data for automatically generating navigational application display on the mobile device is transmitted. Such information is described in detail above, and can include map tiles, digital photographic images, satellite overhead images, plane-view images, and similar displays for turn-by-turn driving the directions, along with additional information for the directions. Additional information may also be included in order to direct a navigation application in presenting the information to a user, and in responding to input from the user and changes in the location of the mobile device. Particular manners in which such information may be displayed to a user, and may interact with a user, are described in more detail above and below.

Figure 5B:
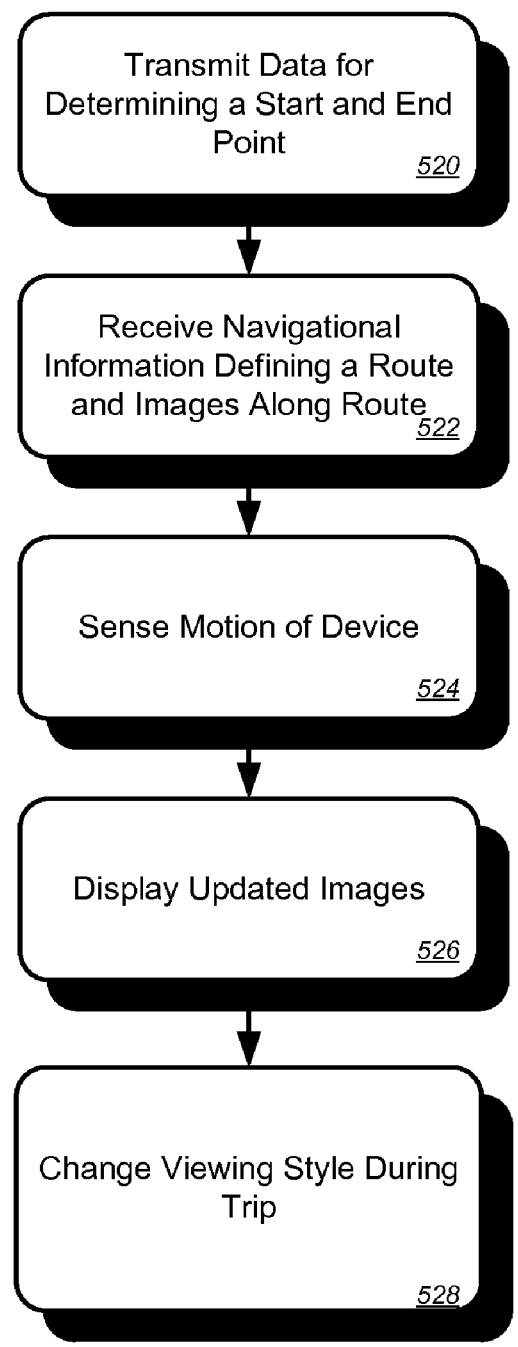

FIG. 5B is a flow chart of a process for generating navigational information that includes street-level imaging. In general, the process may include various of the steps discussed in FIG. 5A, but may provide particular user interactions with respect to street-level digital photographic images in particular areas along the route of a navigation.

The process starts at box 520, where data is transmitted for determining a start and end point for a trip relating to a mobile computing device. The data may be transmitted from the mobile device to a server, or may be generated by a subsystem in a larger server system and transmitted to another subsystem.

At box 522, the process receives navigational information that defines a route and images along a route. For example, a mobile device may operate according to the process described in FIG. 5A to receive street-level images along a route determined between the start and at the end. The received images may arrive in a batch of images along an entire route, and the mobile device may store the images for later display as the user moves along the route. Alternatively, the mobile device may call for additional images as the user moves along the route.

At box 524, the process senses motion of the mobile device. Such motion may be determined in familiar ways by using a GPS module on the device, such as in manners commonly used to show moving on a map of a mapping application or navigation service. When such motion is sensed, images displayed along the route may be updated for the display, at box 526, in coordination of movement of the user along the route. For example, if a user is looking at a map view of a route and is moving south, new tiles may need to be obtained for display at the bottom of a display screen as the screen pans with the user's movement. Alternatively, as a user moves forward on a route, street-level photographs may need to be changed to match photographs taken around the user's current location on a route. The changing of such photographs or images may be blended rather than sudden, so as to give the user more of a sense of motion along the route that matches what they are experiencing out the windows of their vehicle.

At box 528, a viewing style is changed during the trip. The viewing style reflects an angle from which the route is being displayed to the user, or a type of graphical object that is being used to display the route. For example, map displays are typically shown from directly above, as are satellite displays. Also, some displays use drawn objects (maps or most navigation displays) while others use photographed images (e.g., satellite and street-level displays taken from all angles from a vehicle that previously traveled a portion of the route).

As described above, the changes in viewing style may be responsive to various events. In one implementation, the event may be a change in the speed of the vehicle in which the navigational directions are being displayed. For example, if the vehicle speed falls below a threshold, a display style may change from a display of drawn figures or overhead figures, to a display of street-level figures, whether drawn or photographic images. Such a change may occur under the assumption that a user is more interested in seeing the faces of buildings when they are moving slowly, whereas they are more interested in seeing a map when they are moving quickly. A change in display style may also occur in response to a location of a user, and in particular, the presence of the user at or near a particular waypoint along a route or an endpoint on the route. Thus, for example, if an important venue is located along a route, such as a sports stadium, the view a user sees may be augmented to show photographic street-level images of the stadium to the user as the user approaches the stadium. Alternatively, when a user is in a pre-determined distance of the end of a route, street-level photographs may be shown, such as within a quarter-mile of an endpoint, under an assumption that the user will be looking for a particular venue that they are supposed to visit, and that they will want to see storefronts or other identifying indications of the target location.

Figure 5C:
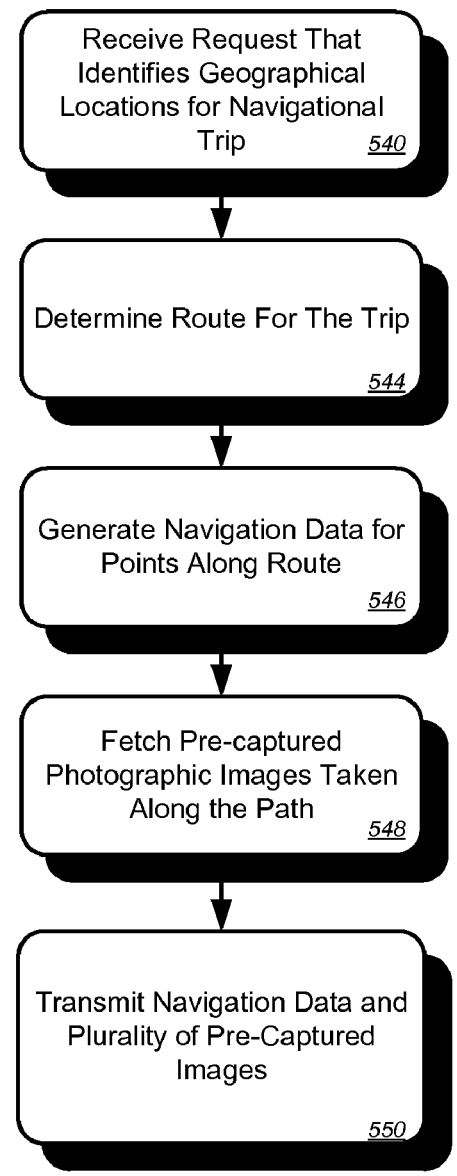

FIG. 5C is a flow chart of a process for generating navigational information that can be used by a client device. In general, the process is similar to and can incorporate steps from the processes discussed with respect to FIG. 5A and FIG. 5B, but is focused on the ability to obtain drawn or photographic images for a route from a server system before such images are needed by a mobile device, so that the images can be displayed even if the mobile device connection to the server system is broken during a trip.

The process begins at box 540, where a request is received that identifies geographic locations for a navigational trip (e.g., start and end points). For example, a server system may receive a query or other request such as that discussed above with respect to FIG. 5A. At box 544, the process determines a route for the trip. For example, a start point for the trip may be determined by a current location of the requesting device, and an endpoint for the trip may be determined by mechanisms as described above. A route for the trip may be determined using various techniques for identifying routes, and may take into account such factors as expected roadway speeds (where freeways move at faster speeds than local streets), and current traffic conditions, so as to provide an easy and fast route between the two points.

At box 546, navigation data for points along the route is generated. For example, particular geographic points may be used in a system to identify data correlated to those points. Such data may include data for venues such as businesses that indicated a desire to have their information displayed on a map or navigational application. The information may also include images, including drawn (e.g., map tiles) or photographic representations of a geography. Each such piece of information may be correlated to a particular geographic point for easy recovery of the information. Thus, for instance, a route may have points set at intervals along the route, such as every 10 feet, and each such point may be queried by the process here to collect the images that correspond to each of the points along the route.

At box 548, photographic images that previously were taken along the route may be fetched and may be delivered to the mobile device along with associated metadata for generating a navigational turn-by-turn display for the entire route on the device, such as on a navigational application executing on the device. At box 550, the navigation data and the pre-captured images are transmitted to the mobile device. Such transmission may occur before any motion of the device along the route has been identified by the server system. Thus, the transfer of all the images, which may cover an entire route or a substantial portion of the route, may be the last transmission that is needed from the server system to the mobile device in order to carry out the navigational job at hand. In this manner, the process just described may provide a convenient and portable mechanism by which to receive navigational information, and may be employed by users who cannot afford or do not otherwise have reliable long-range data connections, such as users who rely on WiFi access points for network connections.

Figure 5D:
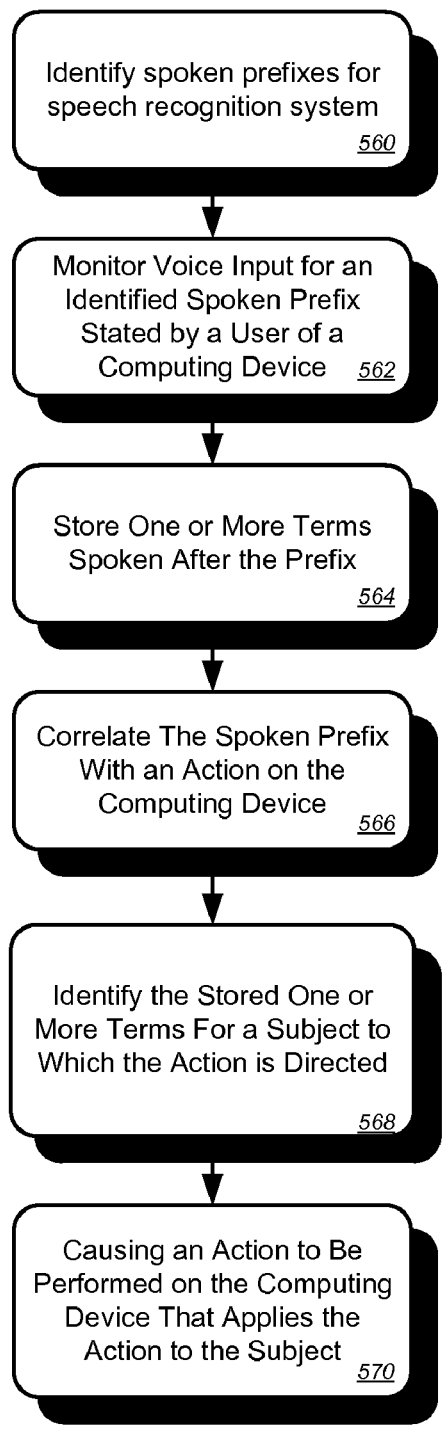

FIG. 5D is a flow chart of a process for identifying actions for performance on a computing device using spoken carrier phrases. In general, the process involves receiving spoken inputs, identifying control terms or carrier phrases in those inputs, using the carrier phrases to select a particular action to perform on subsequent spoken inputs (e.g., words that are spoken immediately after a carrier phrase), converting the subsequent inputs to text, and performing the selected action or actions on the subsequent inputs.

The process begins at box 560, where a spoken prefix or prefixes are identified for a speech recognition system. The prefixes may be in a list of reserved terms on a computing device, where the reserved terms are designed to reflect particular requests for particular actions by a user. Certain such terms are discussed above, and are preferably selected to be terms that a user would speak only when they want to invoke a particular action, and not in common conversation in other contexts. Once the system is provided with the reserved terms, it can perform particular defined action when it hears those terms.

At box 562, the system begins monitoring voice input to determine when the user speaks one of the carrier phrases on the computing device. Such monitoring may be performed only upon an explicit indication from a user that he or she would like to speak an input, or the monitoring may be more continuous. Where the monitoring is more continuous, various mechanisms may be used to protect personal information that may be gathered. For example, all monitoring may occur only on the user's local device, and information that is monitored may be stored only for the short time needed to determine whether a carrier phrase was spoken. Also, all monitored information may be immediately hashed, and the hashed information may be compared to hashed versions of carrier phrases, so that the actual input from the user cannot be determined, except to the extent that it can be known that the input matched a carrier phrase.

Where a prefix in the form of a carrier phrases is identified, at box 564, the process may then store one or more terms that are spoken after the prefix or carrier phrase. For example, the device may begin recording as soon as a carrier phrase is identified, and may continue recording until a pause of a predetermined duration is made by the user.

At box 566, the spoken prefix is correlated with an action that may be performed on the computing device. For example, the action may include the playing of a song, the paying of an amount of money to another user, the generation of navigation or map information, and other examples discussed above.

At box 568, the subsequent terms spoken by the user may be identified for performing of the action on them. Such identification may include performing speech-to-text conversion on the stored spoken terms that occurred at box 564. At box 570, the process causes actions to be performed on the computing device, to apply the identified action to the identified subject (which is represented by the subsequently spoken words). For example, where the action is "play" and the subject as is Lynyrd Skynyrd, the action may be the playing of a song stored on a mobile device or a list of songs that are identified as being sung by the band Lynyrd Skynyrd. Other operations, where the carrier phrase acts as a verb for an action, and subsequent spoken input by a user acts as a subject for the action, may also be subsequently performed in response to other spoken imports from a user. Generally, the verb identifies an application that should be executed for the input. The subject represents an object or other item in the system that should be acted on by the action. Examples of such subjects include geographic locations, artist or song names, payment recipients, electronic mail message recipients, and other similar items.

In this manner, a user may be allowed to easily speak a shorthand for an action into their mobile device, followed by a parameter for the action. Carrier phrases may be selected in a manner that is intuitive for users, so that users may readily control their mobile devices was spoken imports and thus enable simple hands-free operation of their devices. As a result, users of such devices may increase their use of the devices and may enjoy their devices more.

FIGS. 6A-6E show example screen shots of a smartphone-based navigation application. In general, the images show particular example user displays that may be generated by the systems discussed here.

FIG. 6A is a display of a map having a 3D effect, with a route along the middle of the map, on a device 602. Turn-by-turn directions are shown in a familiar manner at the top of the display, and an estimated time to arrival is shown in the bottom corner along with a dot that is colored to express the upcoming traffic situation (green, yellow, and red). Pins for various facilities are also shown along the route. A similar display is shown to the right, though in landscape format.

The route for the navigation may have been determined using the techniques discussed above. The information displayed on the device 602 may be provided to a navigation application on the device 602 by various server systems and may be transmitted to the device 602 from a single interface server (e.g., a web server) or from multiple different servers. For example, the background image may be served by a particular server sub-system, while the data for generating the annotations (e.g., pins for restaurants and other venues) may be generated by a separate sub-system. The navigation application may operate to combine such information, to show a superimposed line for the path of the trip, and to update the display depending on the current geographic location of the device 602.

FIG. 6B is similar FIG. 6A, and shows a navigation display in a landscape orientation on a device 604. A header indicates visually to a user that they need to turn right in 1.4 miles, and such instructions may be followed up with verbal, spoken announcements in a familiar manner as the turn point nears. The header also shows prominently the name of the street onto which the turn is to occur. Also, an estimated time until arrival is shown in a lower left corner of the display.

FIG. 6C shows an aerial or satellite view at a slight angle for a 3D effect on a display of device 606. Again, a line (superimposed with arrows) shows the route, the display indicates that a left turn will be needed in 200 feet onto Oak street, the ETA is 21 minutes, and a green dot indicates that coming traffic is light.

Figure 6E:
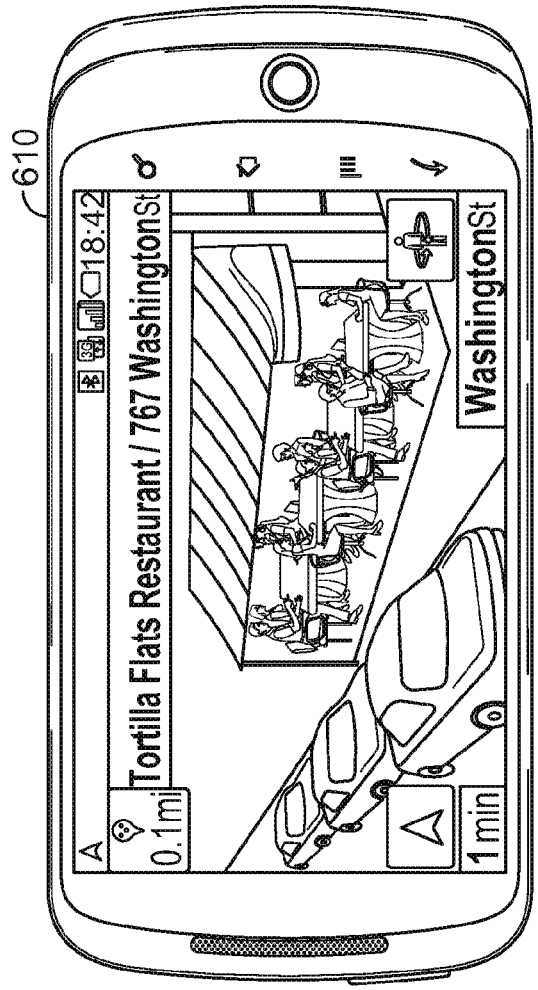
Figure 6D:
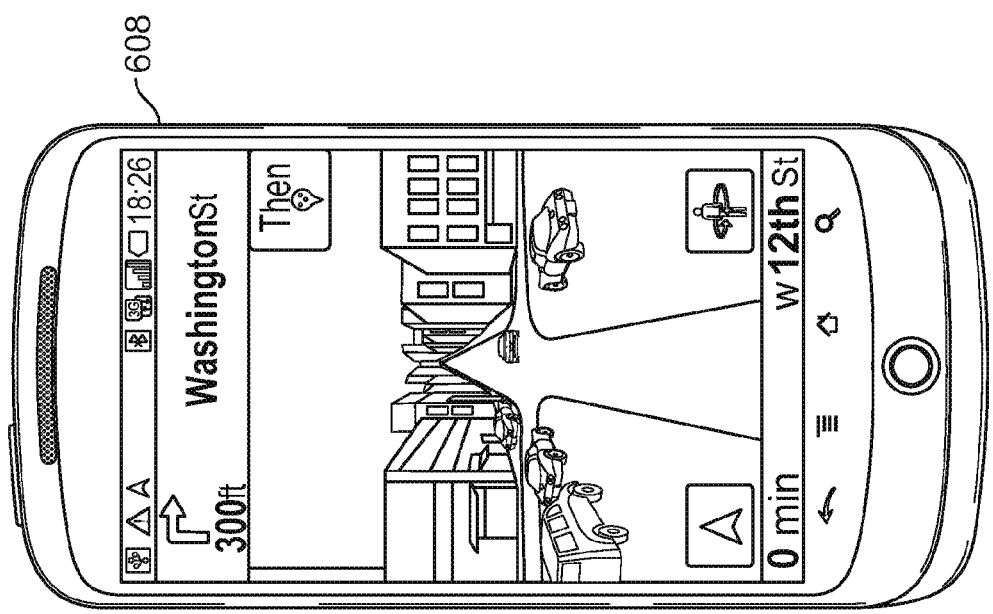

FIGS. 6D and 6E show street level views from a navigation application on a mobile device 608. In the left view, the user is looking forward down a street, while in the right hand image, the point of view has rotated to the side somewhat because the destination restaurant is to be to that side of the user. Thus, if the navigation ends on this image, the driver can know that they are supposed to go to the facility with outdoor dining and a striped awning. The name of the destination venue is also displayed to confirm for the user that they are at the right place.

In other instances, the display may show a combination of forward and side images for a more immersive effect. In certain implementations, one or more of the areas of a stitched-together panorama may be distorted depending on the area that the device 610 has determined to be most important. For example, as a user gets closer to a destination, a map view may change to a "surround" street-level view where the images to the side are visually compressed so that they can be sensed but not seen clearly. As the user gets closer to her destination or as she slows down (as determined using GPS function in the device), the front part of the surround image may be compressed and the side images expanded. Such a transition may be sudden (e.g., switching from one mode to the other when the speed falls below 20 miles per hour) or gradually, e.g., changing the focus of the surround image in a linear manner as the user approaches the end of a trip.

In addition, although the relatively small screen size shown in these images is small and thus limits what can be displayed with the navigation application, other implementations may use touch-screen tablet computers and may thus fit more information on such larger screens. For example, an animated overhead map view may be displayed on one side of a screen, while street-level views and other information may be displayed on the other half simultaneously. Other various arrangements of a display may also be implemented, and additional information may also be displayed on a device.

Figure 7:
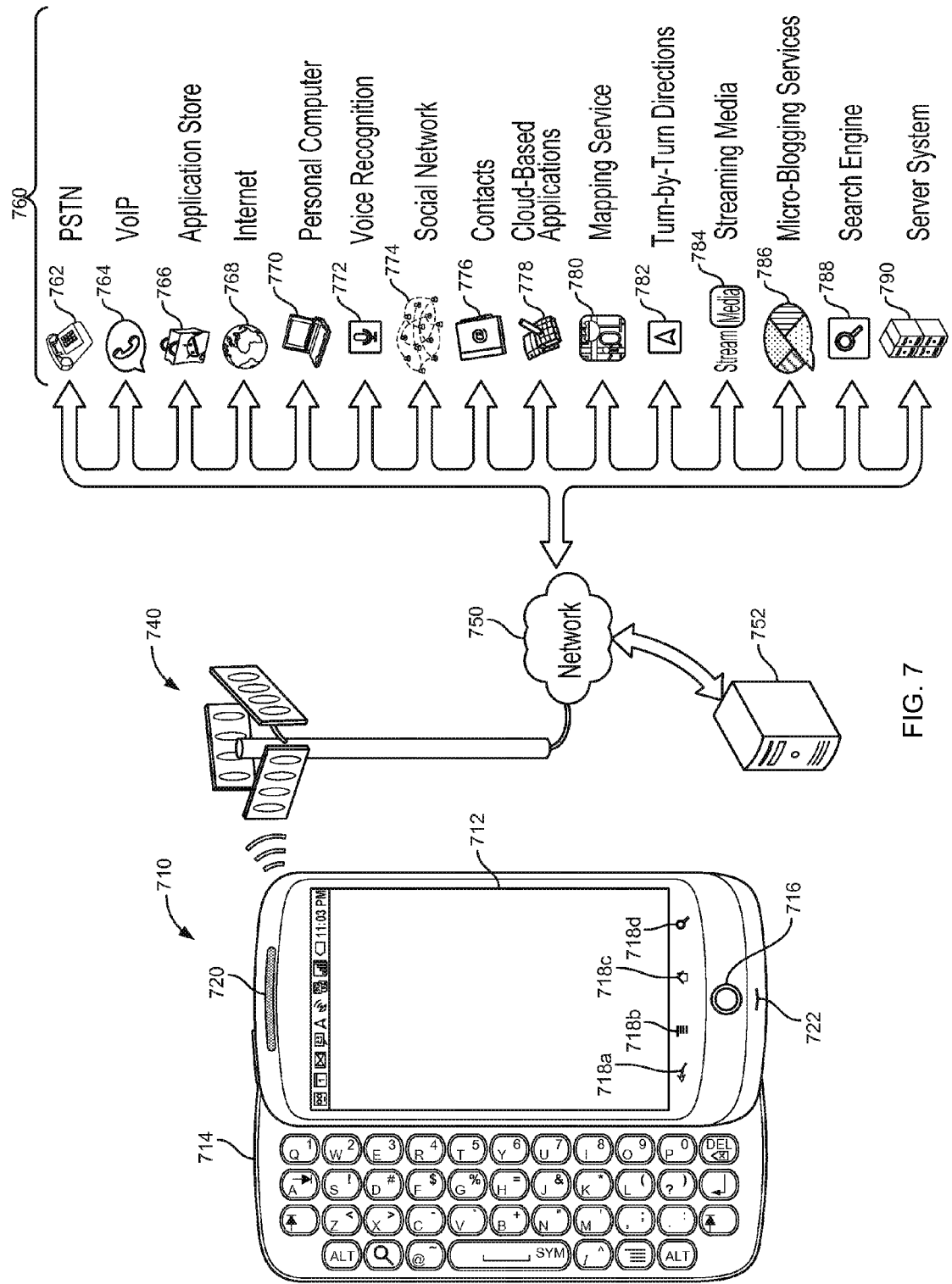
FIG. 7 is a conceptual diagram of a system that may be used to implement the systems and methods described in this document.

Referring now to FIG. 7, a conceptual diagram of a system that may be used to implement the systems and methods described in this document is illustrated. In the system, mobile computing device 710 can wirelessly communicate with base station 740, which can provide the mobile computing device wireless access to numerous hosted services 760 through a network 750.

In this illustration, the mobile computing device 710 is depicted as a handheld mobile telephone (e.g., a smartphone, or application telephone) that includes a touchscreen display device 712 for presenting content to a user of the mobile computing device 710 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 714, physical buttons, trackballs, accelerometers, gyroscopes, and magnetometers).

Example visual output mechanism in the form of display device 712 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 710. The mobile computing device 710 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 714, which may be a full qwerty keyboard or a traditional keypad that includes keys for the digits '0-9', '#', and The keyboard 714 receives input when a user physically contacts or depresses a keyboard key. User manipulation of a trackball 716 or interaction with a trackpad enables the user to supply directional and rate of rotation information to the mobile computing device 710 (e.g., to manipulate a position of a cursor on the display device 712).

The mobile computing device 710 may be able to determine a position of physical contact with the touchscreen display device 712 (e.g., a position of contact by a finger or a stylus). Using the touchscreen 712, various "virtual" input mechanisms may be produced, where a user interacts with a graphical user interface element depicted on the touchscreen 712 by contacting the graphical user interface element. An example of a "virtual" input mechanism is a "software keyboard," where a keyboard is displayed on the touchscreen and a user selects keys by pressing a region of the touchscreen 712 that corresponds to each key.

The mobile computing device 710 may include mechanical or touch sensitive buttons 718a-d. Additionally, the mobile computing device may include buttons for adjusting volume output by the one or more speakers 720, and a button for turning the mobile computing device on or off. A microphone 722 allows the mobile computing device 710 to convert audible sounds into an electrical signal that may be digitally encoded and stored in computer-readable memory, or transmitted to another computing device. The mobile computing device 710 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 710 may present a graphical user interface with the touchscreen 712. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 704. User-selection of the button may invoke the pre-defined action.

In some examples, the operating system provides a "desktop" user interface that is displayed upon turning on the mobile computing device 710, activating the mobile computing device 710 from a sleep state, upon "unlocking" the mobile computing device 710, or upon receiving user-selection of the "home" button 718c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 710 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 712 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 710 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 710 may include other application modules and hardware. A call handling unit may receive an indication of an incoming telephone call and provide a user capabilities to answer the incoming telephone call. A media player may allow a user to listen to music or play movies that are stored in local memory of the mobile computing device 710. The mobile telephone 710 may include a digital camera sensor, and corresponding image and video capture and editing software. An internet browser may enable the user to view content from a web page by typing in an addresses corresponding to the web page or selecting a link to the web page.

The mobile computing device 710 may include an antenna to wirelessly communicate information with the base station 740. The base station 740 may be one of many base stations in a collection of base stations (e.g., a mobile telephone cellular network) that enables the mobile computing device 710 to maintain communication with a network 750 as the mobile computing device is geographically moved. The computing device 710 may alternatively or additionally communicate with the network 750 through a Wi-Fi router or a wired connection (e.g., Ethernet, USB, or FIREWIRE). The computing device 710 may also wirelessly communicate with other computing devices using BLUETOOTH protocols, or may employ an ad-hoc wireless network.

A service provider that operates the network of base stations may connect the mobile computing device 710 to the network 750 to enable communication between the mobile computing device 710 and other computerized devices that provide services 760. Although the services 760 may be provided over different networks (e.g., the service provider's internal network, the Public Switched Telephone Network, and the Internet), network 750 is illustrated as a single network. The service provider may operate a server system 752 that routes information packets and voice data between the mobile computing device 710 and computing devices associated with the services 760.

The network 750 may connect the mobile computing device 710 to the Public Switched Telephone Network (PSTN) 762 in order to establish voice or fax communication between the mobile computing device 710 and another computing device. For example, the service provider server system 752 may receive an indication from the PSTN 762 of an incoming call for the mobile computing device 710. Conversely, the mobile computing device 710 may send a communication to the service provider server system 752 initiating a telephone call with a telephone number that is associated with a device accessible through the PSTN 762.

The network 750 may connect the mobile computing device 710 with a Voice over Internet Protocol (VoIP) service 764 that routes voice communications over an IP network, as opposed to the PSTN. For example, a user of the mobile computing device 710 may invoke a VoIP application and initiate a call using the program. The service provider server system 752 may forward voice data from the call to a VoIP service, which may route the call over the internet to a corresponding computing device, potentially using the PSTN for a final leg of the connection.

An application store 766 may provide a user of the mobile computing device 710 the ability to browse a list of remotely stored application programs that the user may download over the network 750 and install on the mobile computing device 710. The application store 766 may serve as a repository of applications developed by third-party application developers.

An application program that is installed on the mobile computing device 710 may be able to communicate over the network 750 with server systems that are designated for the application program. For example, a VoIP application program may be downloaded from the Application Store 766, enabling the user to communicate with the VoIP service 764.

The mobile computing device 710 may access content on the internet 768 through network 750. For example, a user of the mobile computing device 710 may invoke a web browser application that requests data from remote computing devices that are accessible at designated universal resource locations. In various examples, some of the services 760 are accessible over the internet.

The mobile computing device may communicate with a personal computer 770. For example, the personal computer 770 may be the home computer for a user of the mobile computing device 710. Thus, the user may be able to stream media from his personal computer 770. The user may also view the file structure of his personal computer 770, and transmit selected documents between the computerized devices.

A voice recognition service 772 may receive voice communication data recorded with the mobile computing device's microphone 722, and translate the voice communication into corresponding textual data. In some examples, the translated text is provided to a search engine as a web query, and responsive search engine search results are transmitted to the mobile computing device 710.

The mobile computing device 710 may communicate with a social network 774. The social network may include numerous members, some of which have agreed to be related as acquaintances. Application programs on the mobile computing device 710 may access the social network 774 to retrieve information based on the acquaintances of the user of the mobile computing device. For example, an "address book" application program may retrieve telephone numbers for the user's acquaintances. In various examples, content may be delivered to the mobile computing device 710 based on social network distances from the user to other members. For example, advertisement and news article content may be selected for the user based on a level of interaction with such content by members that are "close" to the user (e.g., members that are "friends" or "friends of friends").

The mobile computing device 710 may access a personal set of contacts 776 through network 750. Each contact may identify an individual and include information about that individual (e.g., a phone number, an email address, and a birthday). Because the set of contacts is hosted remotely to the mobile computing device 710, the user may access and maintain the contacts 776 across several devices as a common set of contacts.

The mobile computing device 710 may access cloud-based application programs 778. Cloud-computing provides application programs (e.g., a word processor or an email program) that are hosted remotely from the mobile computing device 710, and may be accessed by the device 710 using a web browser or a dedicated program. Example cloud-based application programs include GOOGLE DOCS word processor and spreadsheet service, GOOGLE GMAIL webmail service, and PICASA picture manager.

Mapping service 780 can provide the mobile computing device 710 with street maps, route planning information, and satellite images. An example mapping service is GOOGLE MAPS. The mapping service 780 may also receive queries and return location-specific results. For example, the mobile computing device 710 may send an estimated location of the mobile computing device and a user-entered query for "pizza places" to the mapping service 780. The mapping service 780 may return a street map with "markers" superimposed on the map that identify geographical locations of nearby "pizza places."

Turn-by-turn service 782 may provide the mobile computing device 710 with turn-by-turn directions to a user-supplied destination. For example, the turn-by-turn service 782 may stream to device 710 a street-level view of an estimated location of the device, along with data for providing audio commands and superimposing arrows that direct a user of the device 710 to the destination.

Various forms of streaming media 784 may be requested by the mobile computing device 710. For example, computing device 710 may request a stream for a pre-recorded video file, a live television program, or a live radio program. Example services that provide streaming media include YOUTUBE and PANDORA.

A micro-blogging service 786 may receive from the mobile computing device 710 a user-input post that does not identify recipients of the post. The micro-blogging service 786 may disseminate the post to other members of the micro-blogging service 786 that agreed to subscribe to the user.

A search engine 788 may receive user-entered textual or verbal queries from the mobile computing device 710, determine a set of internet-accessible documents that are responsive to the query, and provide to the device 710 information to display a list of search results for the responsive documents. In examples where a verbal query is received, the voice recognition service 772 may translate the received audio into a textual query that is sent to the search engine.

These and other services may be implemented in a server system 790. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 8:
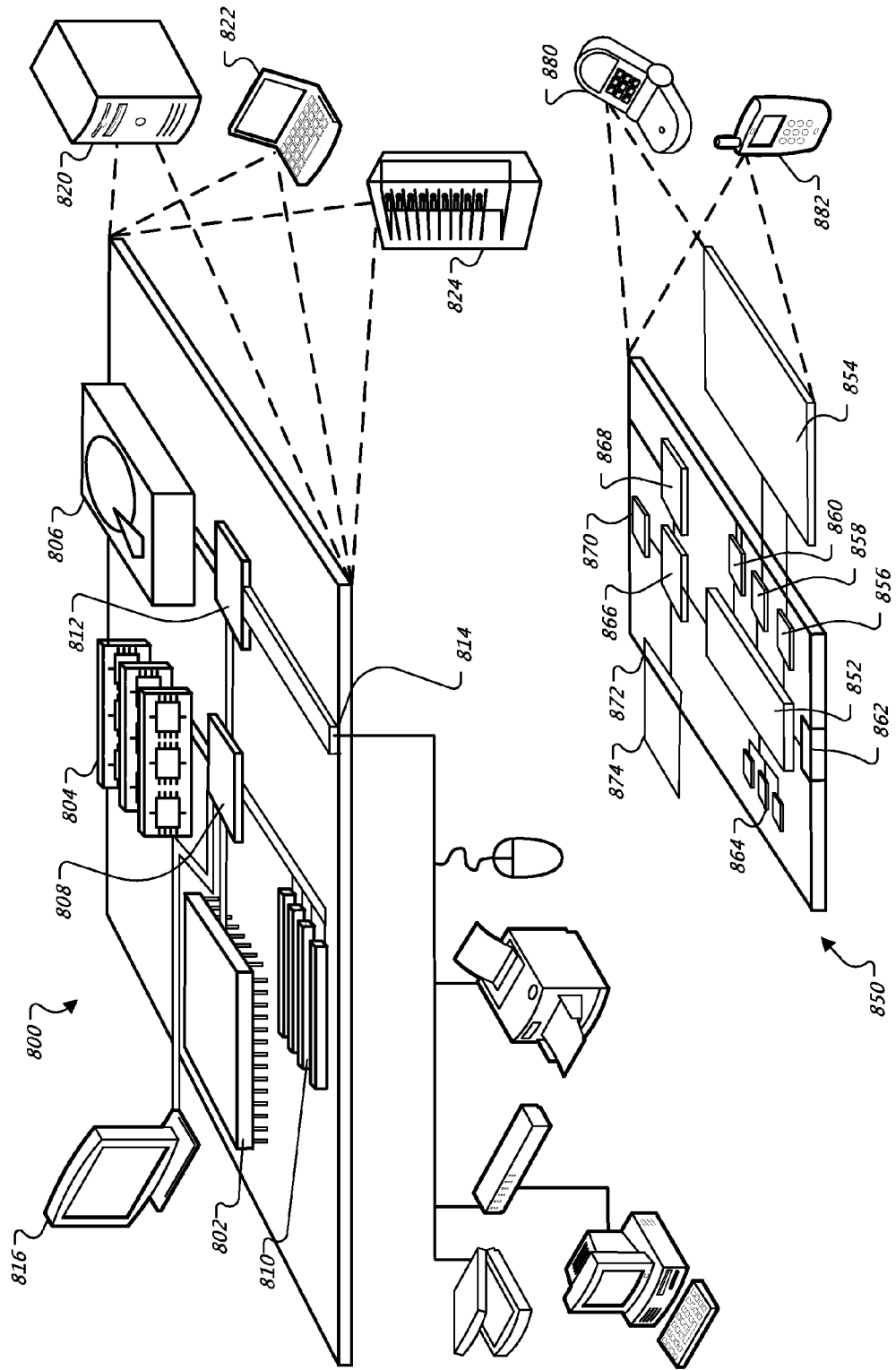
FIG. 8 is a block diagram of computing devices that may be used to implement the systems and methods described in this document, as either a client or as a server or plurality of servers.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving spoken input at a computing device from a user of the computing device, the spoken input including a carrier phrase and a subject to which the carrier phrase is directed;
providing at least a portion of the spoken input to a server system in audio form for speech-to-text conversion by the server system, the portion including the subject to which the carrier phrase is directed;
receiving from the server system instructions for automatically performing an operation on the computing device, the operation including an action defined by the carrier phrase using parameters defined by the subject; and
automatically performing the operation on the computing device.

2. The method of claim 1, wherein the carrier phrase comprises an instruction to execute a navigation application, and the subject describes a geographical landmark.

3. The method of claim 2, wherein the subject describes a geographical landmark without naming the geographical landmark.

4. The method of claim 2, wherein the carrier phrase is "navigate to".

5. The method of claim 2, wherein the operation comprises displaying turn-by-turn navigation in an application, wherein data for the turn-by-turn navigation is generated by the server system for a navigation route from a current location of the computing device to a location described by the subject.

6. The method of claim 1, wherein the carrier phrase comprises an instruction to play a media file, and the subject describes the media file to be played.

7. The method of claim 6, wherein the subject includes a name of content in the media file.

8. The method of claim 1, wherein the subject comprises a search query and the prefix identifies operations to be conducted on search results for the search query.

9. The method of claim 8, wherein the operations to be conducted on the search results comprises parsing a landing page corresponding to a search result for a designated type of information.

10. The method of claim 9, wherein the designated type of information comprises a location.

11. The method of claim 1, wherein the operation is selected from multiple operations that can be performed on the computing device, wherein each of the multiple operations is associated with a different carrier phrase than each of the other operations.

12. The method of claim 1, further comprising:
receiving input at the computing device from the user while the operation is being performed on the computing device; and
responding to the received input by the computing device.

13. The method of claim 1, further comprising:
receiving, at the computing device, second spoken input that includes a carrier phrase that differs from the carrier phrase included in the spoken input, and a second subject to which the second carrier phrase is directed;
providing at least a portion of the second spoken input to the server system in audio form for speech-to-text conversion by the server system, the portion including the second subject;
receiving from the server system second instructions for automatically performing a second operation on the computing device, the second operation including an action defined by the second carrier phrase, and using parameters that are defined by the second subject; and
automatically performing the second operation on the computing device.

14. The method of claim 1, wherein the spoken input is hashed on the computing device and the instructions for automatically performing an operation are identified by comparing the hashed version of the spoken input to hashed versions of previously spoken input that matches the spoken input, in order to identify the carrier phrase.

15. A computer-implemented method, comprising:
receiving, at a computer server system from a remote computing device, audio spoken by a user of the computing device, the audio including a subject to which a spoken carrier phrase form the user was directed;
performing speech-to-text conversion on the audio by the computer server system;
generating data for execution on the computing device to cause the computing device to automatically perform an operation identified by the carrier phrase using the subject as a parameter of the operation; and
transmitting the data to the computing device.

16. The method of claim 15, further comprising receiving an textual identifier of the carrier phrase, wherein the computing device identified the carrier phrase before providing the audio to the computer server system.

17. The method of claim 16, further comprising using the identifier to select a grammar for performing the speech-to-text conversion.

18. The method of claim 15, wherein the carrier phrase comprises an instruction to execute a navigation application, and the subject describes a geographical landmark.

19. The method of claim 18, wherein the subject describes a geographical landmark without naming the geographical landmark.

20. The method of claim 18, wherein the carrier phrase is "navigate to".

21. The method of claim 18, wherein the operation comprises displaying turn-by-turn navigation in an application, wherein data for the turn-by-turn navigation is generated by the server system for a navigation route from a current location of the computing device to a location described by the subject.

22. The method of claim 15, wherein the carrier phrase comprises an instruction to play a media file, and the subject describes the media file to be played.

23. The method of claim 22, wherein the subject includes a name of content in the media file.

24. The method of claim 15, wherein the subject comprises a search query and the carrier phrase identifies operations to be conducted on search results for the search query.

25. The method of claim 24, wherein the operations to be conducted on the search results comprises parsing a landing page corresponding to a search result for a designated type of information.

26. The method of claim 25, wherein the designated type of information comprises a location.

27. One or more tangible non-transient machine-readable media storing instructions that, when executed, perform actions comprising:
receiving spoken input at a computing device from a user of the computing device, the spoken input including a carrier phrase and a subject to which the carrier phrase is directed;
providing at least a portion of the spoken input to a server system in audio form for speech-to-text conversion by the server system, the portion including the subject to which the carrier phrase is directed;
receiving from the server system instructions for automatically performing an operation on the computing device, the operation including an action defined by the carrier phrase using parameters defined by the subject; and
automatically performing the operation on the computing device.

28. The machine-readable media of claim 27, wherein the carrier phrase comprises an instruction to execute a navigation application, and the subject describes a geographical landmark.

29. The machine-readable media of claim 27, wherein the carrier phrase comprises an instruction to play a media file, and the subject describes the media file to be played.

30. The machine-readable media of claim 27, wherein the subject comprises a search query and the carrier phrase identifies operations to be conducted on search results for the search query.

* * * * *